US007345965B2

(12) United States Patent
Büchler

(10) Patent No.: US 7,345,965 B2
(45) Date of Patent: Mar. 18, 2008

(54) METHOD FOR TRACK COUNTING AND CORRESPONDING APPARATUS FOR READING FROM AND/OR WRITING TO AN OPTICAL RECORDING MEDIUM

(75) Inventor: Christian Büchler, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 787 days.

(21) Appl. No.: 10/450,331

(22) PCT Filed: Dec. 3, 2001

(86) PCT No.: PCT/EP01/14089

§ 371 (c)(1),
(2), (4) Date: Jun. 12, 2003

(87) PCT Pub. No.: WO02/49022

PCT Pub. Date: Jun. 20, 2002

(65) Prior Publication Data

US 2004/0037177 A1    Feb. 26, 2004

(30) Foreign Application Priority Data

Dec. 13, 2000   (DE)  ............................ 100 62 079

(51) Int. Cl.
*G11B 7/095* (2006.01)

(52) U.S. Cl. .................... 369/44.28; 369/44.37
(58) Field of Classification Search .......... None
See application file for complete search history.

(56) References Cited

U.S. PATENT DOCUMENTS 4,484,319 A   11/1984   Koishi et al. ................. 369/46
5,774,433 A   6/1998   Rokutan ................... 369/44.28
5,909,416 A   6/1999   Matsui ..................... 369/44.41

FOREIGN PATENT DOCUMENTS

| DE | 39 32 832 | 9/1989 |
| EP | 0 512 625 | 11/1992 |
| EP | 0 525 896 | 2/1993 |
| EP | 0 536 718 | 4/1993 |
| EP | 0 745 982 | 12/1996 |
| JP | 2000251274 A | * 9/2000 |
| WO | 02/17310 | 2/2002 |

OTHER PUBLICATIONS

"*Track-Crossing Detection and Seek-Direction Sensing*", IBM Technical Disclosure Bulletin, IBM Corp., New York, vol. 33, No. 10A, Mar. 1, 1991, pp. 398-403.

* cited by examiner

*Primary Examiner*—William Korzuch
*Assistant Examiner*—Jorge L. Ortiz-Criado
(74) *Attorney, Agent, or Firm*—Joseph J. Lake; Paul P. Kiel; Joseph J. Opalach

(57) ABSTRACT

In an apparatus for reading from and/or writing to an optical recording medium, it is desirable, in particular in the case of track jumps, to detect the direction of the track jump, i.e. the direction of movement of an objective lens of the apparatus relative to the optical recording medium in order to be able to carry out corresponding track regulation. For this purpose, and also for determining the number of tracks crossed by the scanning beams, it is proposed to determine the number of zero crossings and also the phase difference between at least two error signals derived from the reflected scanning beams.

12 Claims, 14 Drawing Sheets

METHOD FOR TRACK COUNTING AND CORRESPONDING APPARATUS FOR READING FROM AND/OR WRITING TO AN OPTICAL RECORDING MEDIUM

This application claims the benefit under 35 U.S.C. § 365 of International Application PCT/EP01/14089, filed Dec. 3, 2001, which claims the benefit of German Patent Application No. 100 62 079.5, filed Dec. 13, 2000.

BACKGROUND OF THE INVENTION

The present invention relates to a method for track counting which, in the course of track counting, takes account of the direction of movement of an objective lens of an apparatus for reading from and/or writing to an optical recording medium with regard to tracks situated on the said recording medium, and also to a corresponding apparatus for reading from and/or writing to an optical recording medium.

In conventional apparatuses for reading from and/or writing to optical recording media, for example DVD-RAMs, generally a track error signal is generated, which serves as a basis for the track regulation in the respective apparatus. One method for generating this track error signal is the DPP method, for example. The DPP method ("Differential Push-Pull") is described e.g. in EP 0 745 982 A2.

In accordance with the DPP method, a laser beam is split into three beams, namely a primary beam and two secondary beams which scan adjacent tracks of the optical recording medium respectively used. The primary and secondary beams reflected from the optical recording medium are detected and evaluated in accordance with the known push-pull method in order to obtain the track error signal. In the process, considered by themselves in each case, both the primary beam and the secondary beams generate a push-pull signal which represents the track error of the respective signal with regard to the respectively scanned track. The desired track error signal can be generated by weighted combinations of the primary-beam and secondary-beam track error signals.

FIG. 7 illustrates a corresponding arrangement for carrying out the DPP method. The light emitted by a light source or a laser 1 passes through a collimator lens 2 and is then split into the primary beam (i.e. a 0th-order beam) and the two secondary beams (i.e. ±1st-order beams) by a diffraction grating 3. The primary beam, which reads the information to be scanned in a track of a corresponding recording medium 7, usually contains the majority (approximately 80-90%) of the light information. The two secondary beams each contain the remaining 5-10% of the total light intensity, it being assumed for the sake of simplicity that the light energy of the higher orders of diffraction of the diffraction grating 3 is zero. These three beams are focused onto the optical recording medium 7 via a polarizing beam splitter 4 and a quarter-wave plate 5 and also an objective lens 6, in order to read from and/or write to the said optical recording medium. The three beams reflected from the optical recording medium 7 are fed via the beam splitter 4 and a cylindrical lens 8 to a photodetector unit 9, which detects the three beams reflected from the optical recording medium 7. The three beams are only indicated symbolically here between cylindrical lens 8 and photodetector unit 9. Connected to the photodetector unit 9 is an evaluation unit 10, which evaluates the detected reflected primary and secondary beams for the purpose of generating a track error signal.

FIG. 8 illustrates an example of the imaging of the primary beam 14 and also of the two secondary beams 15, 16 onto a DVD-RAM as optical recording medium 7. In DVD-RAMs and also in some other types of optical recording media, information tracks are contained both in depressions, designated as "groove", and in elevations, designated as "land". In the context of the present patent application, the "groove" tracks are also abbreviated as G and the "land" tracks are abbreviated as L. Since the secondary beams 13 and 15 and the primary beam 14 are intended to be optically separable from one another, the positions of their imaging on the optical recording medium 7 and on the photodetector unit 9 are separate from one another. The diffraction grating 3 is incorporated in such a way that the imaging of the secondary beams impinges precisely on the centre of the secondary track or (in the case of storage media which are written to only in "groove" tracks) precisely on the region between two tracks beside the track read by the primary beam. If the optical recording medium 7 rotates, then one of the secondary beams is situated in front of, and the other secondary beam behind, the primary beam in the reading or writing direction. The evaluation unit 10 of the arrangement shown in FIG. 7 evaluates the light intensities reflected onto the photodetector 9 separately for each of the three beams.

Considered by themselves in each case, both the primary beam and the secondary beams generate, after evaluation by the evaluation unit, a push-pull signal which represents the track error of the respective beam with respect to the track. In the track image illustrated in FIG. 8, the two secondary beams illuminate the secondary tracks with respect to the read track; their push-pull track error component is therefore inverted with respect to that of the primary beam. Considered by themselves, the respective push-pull components thus contain the actual track error with respect to the respectively scanned track. Since the track position of the three beams can only change together, the three push-pull signals change equally.

If the objective lens 6 is then moved, for example in the event of a track jump, then the imaging of primary and secondary beams on the photodetector unit 9 also moves. This displacement of the imaging results in an offset voltage on the push-pull intermediate signals of the evaluation unit 10 which are provided individually for the three beams. The direction of this offset voltage is identical for all of the beams. The displacement of the objective lens 6 thus gives rise to an offset voltage which does not originate from an actual track error and is therefore an interference. The genuine track error component and the undesirable lens-movement-dependent component are added in the evaluated push-pull signal yielded by the respective detectors of the photodetector unit 9.

If the push-pull signals of the secondary beams are then added and this sum is subtracted from the push-pull signal of the primary beam, this undesirable lens-movement-dependent component is cancelled out given appropriate weighting between the primary and secondary beam components. However, since the push-pull components of the primary and secondary beams are inverted with respect to one another, they are added in the correct phase after application of the subtraction, with the result that, given correct setting of the weighting factor within the evaluation unit, all that remains is the actual track error. This will be explained in more detail below.

As has already been mentioned, the track error signal DPP is composed of the push-pull component CPP of the primary beam and the added push-pull components OPP of the secondary beams, the relationships specified in the following formulae (1)-(3) holding true.

$$CPP = a * \sin\left(2\pi * \frac{x}{2p}\right) + kl \quad (1)$$

$$OPP = a * \left(\sin\left(2\pi * \frac{x + \Delta x}{2p}\right) + \sin\left(2\pi * \frac{x - \Delta x}{2p}\right)\right) + 2kl \quad (2)$$

$$DPP = CPP - K*OPP \quad (3)$$

In this case, K designates the weighting factor for the abovementioned weighted subtraction of the OPP signal from the CPP signal. The amplitudes a and k specified in the formulae are factors which depend on the geometry of the scanned tracks, the sensitivity of the photodetectors, etc. The scanning position of each beam relative to the track centre is designated by x, where Δx designates the distance between the two secondary beams and the primary beam. p designates the track spacing of the optical recording medium, in accordance with the definition in a DVD-RAM between "groove" and "land" centre of adjacent tracks, and l designates the movement of the objective lens 6 from its rest position. Since the three beams are mechanically coupled to one another, the variables x and l in formulae (1) and (2) are identical in each case.

For all the considerations below, it is assumed in a simplification that the intensities of the three scanning beams considered are identical when impinging on the photodetector unit 9. In practice, however, the intensity of the secondary beams is dependent on their track position, on the reflection of the track respectively scanned by the beams, and also on the properties of the optical grating, and is weaker than the intensity of the primary beam, with the result that the intensity of the secondary beams must correspondingly be scaled with respect to the primary beam intensity. This is ideally done by normalization.

In order to be able to compensate the lens-movement-dependent component, the following relationship must be satisfied:

$$DPP_l = CPP_l - K*OPP_l \neq 0 \quad (4)$$

where the index "l" designates the lens-movement-dependent component of the corresponding signal. Applying formulae (1) and (2), it follows that the lens-movement-dependent component l can be compensated if the following holds true:

$$K = 0.5 \quad (5)$$

This weighting factor is independent of the orientation of the secondary beams with regard to the primary beam. It is usually attempted to make the track error amplitude a maximum by setting the distance Δx accordingly. With the value K=0.5 determined above, it is possible to express the above formula (3) for the track error component designated by the index "x" as follows:

$$DPP_x = a * \sin\left(2\pi * \frac{x}{2p}\right) - 0.5a * \left(\sin\left(2\pi * \frac{x + \Delta x}{2p}\right) + \sin\left(2\pi * \frac{x - \Delta x}{2p}\right)\right) \quad (6)$$

$$= a * \sin\left(2\pi * \frac{x}{2p}\right) - 0.5a * 2 * \left(\sin\left(\pi * \frac{x}{p}\right) * \cos\left(\pi * \frac{\Delta x}{p}\right)\right)$$

$$= a * \sin\left(\pi * \frac{x}{p}\right) * \left(1 - \cos\left(\pi * \frac{\Delta x}{p}\right)\right)$$

$DPP_x$ becomes a maximum when the following condition is satisfied:

$$\cos\left(\pi * \frac{\Delta x}{p}\right) = -1 \quad (7)$$

This is the case when the following holds true:

$$\Delta x = (2n+1)*p \text{ where } n=0, 1, 2, \ldots \quad (8)$$

In accordance with the prior art, Δx=p is therefore chosen in the simplest case—as is shown in FIG. 8. FIG. 8 also illustrates the profile of the track error signals resulting from this beam arrangement in accordance with the prior art.

From the above-described properties of the DPP method according to the prior art, it is apparent that, owing to the position of the secondary beams, the phase shift between the push-pull signal CPP of the primary beam and the push-pull signals OPP1, OPP2 of the secondary beams is nominally 180°. This is advantageous, when the DPP method is considered as such, since, as a result of the difference formation, the track error components of the primary beam and of the secondary beams are added with the largest possible amplitude. The two secondary beam signals OPP1 and OPP2 are phase-shifted through 360° with respect to one another.

Owing to the phase shift of 180° between the primary beam signal CPP and the individual secondary beam signals OPP1, OPP2 and of 360° between the two secondary beam signals OPP1, OPP2, it is possible, with the aid of suitable comparators, to count the tracks of the optical recording medium 7 crossed by the objective lens 6 only without taking account of the direction of movement of the objective lens. In this case, as shown in FIG. 8, the comparators acquire the signals CPP, OPP1 and OPP2 and generate independently thereof, in this case at the zero crossing, signals KCPP, KOPP1 and KOPP2. By way of example, a so-called "track zero cross" signal TZC can be generated in a manner dependent on the signal KCPP. However, identification of the direction of movement of the objective lens or of the type of track respectively crossed is not possible in this way.

EP-A2-0 392 775 proposes forming the difference between the push-pull signals of the secondary beams and using the resultant difference signal for direction identification.

SUMMARY OF THE INVENTION

The present invention is based on the object of describing an improved method for direction-dependent track counting which, in the course of track counting, takes account of the direction of movement of an objective lens with regard to tracks situated on a recording medium for an apparatus for reading from and/or writing to an optical recording medium, and also of proposing a corresponding apparatus for reading from and/or writing to an optical recording medium.

This object is achieved according to the invention by means of a method having the features of claim 1 and by means of an apparatus having the features of the independent apparatus claim. The subclaims each define preferred and advantageous embodiments of the present invention.

In accordance with a first exemplary embodiment of the present invention, it is proposed to evaluate the phase difference between the secondary-beam error signals generated for the secondary beams reflected from the optical recording medium, in order, in a manner dependent thereon, to detect the direction of movement of the objective lens and correspondingly take it into account in the track counting direction. This procedure is suitable in particular when the secondary beams are imaged onto the optical recording medium with a distance of Δx from an imaginary or additionally generated primary beam which satisfies the following condition:

$$\Delta x = (2j+1)*p \pm \frac{p}{4} \text{ where } j = 0, 1, 2, \ldots \quad (9)$$

In accordance with a second exemplary embodiment of the present invention, it is proposed to detect the phase difference between the primary-beam error signal or the track error signal obtained in a manner dependent thereon and only one of the secondary-beam error signals, and, in a manner dependent thereon, to infer the direction of movement of the objective lens and correspondingly take it into account in the track counting direction. This procedure is suitable in particular for a distance Δx between the secondary beams and the primary beam which satisfies the following condition:

$$\Delta x = (2n+1)*\frac{p}{2} \text{ where } n = 0, 1, 2, \ldots \quad (10)$$

In this case, it may be advantageous for the respective secondary-beam error signal that is to be evaluated to be passed via a high-pass filter before being evaluated.

In accordance with a third exemplary embodiment, it is proposed to add the secondary-beam error signals in each case to the primary-beam error signal, or to subtract them therefrom, and subsequently to detect the phase difference or phase shift between the two signals resulting therefrom, and, in a manner dependent thereon, to infer the direction of movement of the objective lens and correspondingly take it into account in the track counting direction. In this case, subtraction is generally preferable to addition since, upon application of subtraction, the lens-movement-dependent components of the individual secondary-beam error signals cancel one another out. This procedure is suitable in particular for a distance Δx between the secondary beams and the primary beam which satisfies the following condition:

$$\Delta x = (2n+1)*\frac{p}{2} \text{ where } n = 0, 1, 2, \ldots \quad (11)$$

In accordance with a fourth exemplary embodiment, it is proposed to process the respective track error signal components that are to be considered with respect to one another by means of simple logic combinations in such a way that the correct counting direction and also the type of scanned track can be determined in an extended range for Δx.

In accordance with a fifth exemplary embodiment, it is proposed to generate track error components for a single-beam scanner, too, by means of an altered detector arrangement and evaluation, which track error components are derived from different regions of the scanning beam and are imaged onto assigned detector areas in such a way that these track error components can in each case be processed by means of simple logic combinations in such a way that the correct counting direction and also the type of scanned track can be determined in an extended range for Δx.

The present invention is explained in more detail below using preferred exemplary embodiments with reference to the accompanying drawing, in which:

DETAILED DESCRIPTION

In order to enable detection of the direction of movement of the objective lens relative to the tracks of an optical recording medium and also movement-direction-dependent track counting, for example in the event of a track jump, it is desirable to generate two signals whose phase angles with respect to one another change depending on the direction of the track jump from +90° to −90°, or vice versa. Phase angles deviating from ±90° also enable direction detection, but phase angles in the region around ±90° are preferable. The basic requirement is that the phase between the two signals considered unambiguously changes sign in a manner dependent on the direction of movement. In practice, the phase angle is dependent on the calibration accuracy of the setting of the secondary beams with regard to the position of the secondary tracks, on the eccentricity of the scanned medium and other factors. In order to be as certain as possible that the phase relationship depends only on the direction of movement of the scanning beams relative to the tracks, the track position is chosen such that the phase is near ±90°, or does not become 0° or 180°, depending on the direction of movement.

Figure 7:
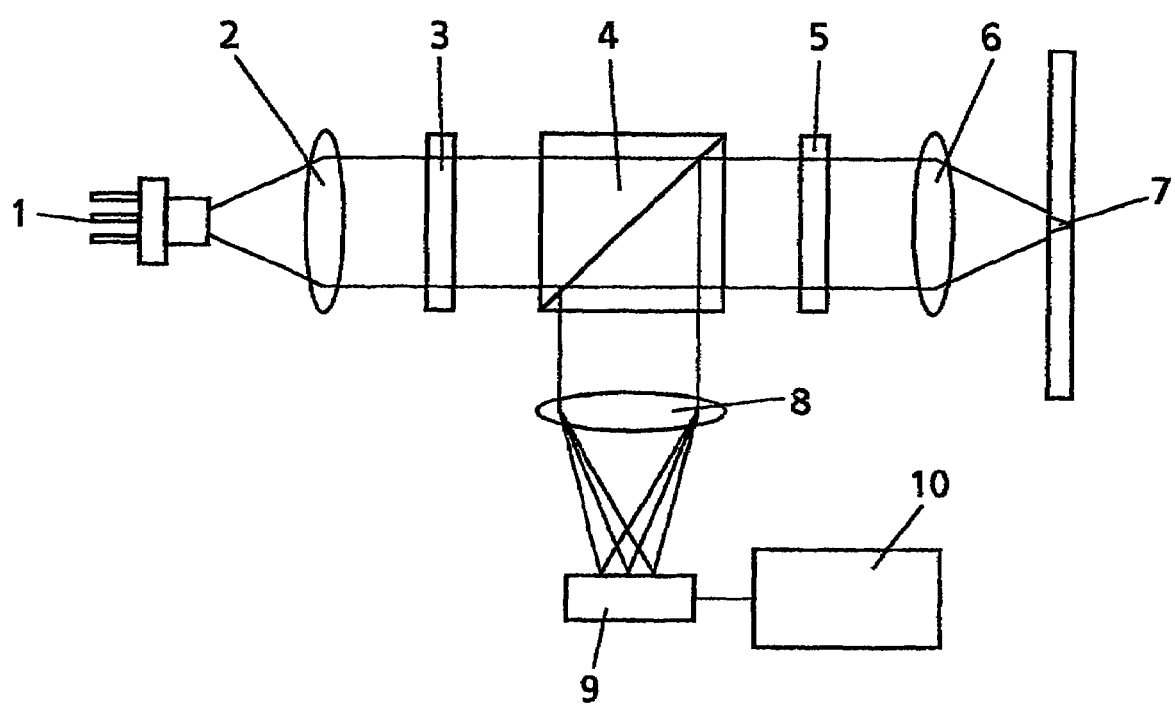
FIG. 7 shows a simplified construction of an optical scanner for carrying out the DPP method according to the prior art, where this construction can, in principle, also be applied to the present invention.

In general, for the comparison of the phase angle, it is possible to use two signals which are generated either directly or indirectly by means of weighted combination of the output signals generated by the photodetector unit 9 shown in FIG. 7. In general, it is possible to use an optical scanner whose scanning beam or scanning beams can be evaluated by a photodetector having a plurality of light-sensitive areas and an evaluation unit in such a way that the resulting output signals contain components which are proportional to the track error signal and originate from mutually different scanning locations or regions of the scanned medium. The simplest way of being able to generate signals which contain track-error-signal-proportional components from different scanning locations is to image onto the optical recording medium 7 respectively used at least two or more beams with a beam position such that two signals having a phase shift of about ±90° are obtained.

These requirements can be satisfied, for example when employing the DPP method, if the diffraction grating 3 shown in FIG. 7 is calibrated not in the customary manner but at a different angle. According to the invention, the criterion of maximum amplitude of the DPP track error signal as described in the introduction is omitted. This makes it possible to establish a criterion for generating the two secondary beams 15, 16 for a phase shift of (2n+1)·±90°.

The following relationships hold true for the secondary-beam error signals OPP1 and OPP2 obtained in a manner dependent on the secondary beams reflected from the optical recording medium:

$$OPP1 = a * \sin\left(2\pi * \frac{x + \Delta x}{2p}\right) + kl \quad (12)$$

$$OPP2 = a * \sin\left(2\pi * \frac{x - \Delta x}{2p}\right) + kl \quad (13)$$

Figure 8:
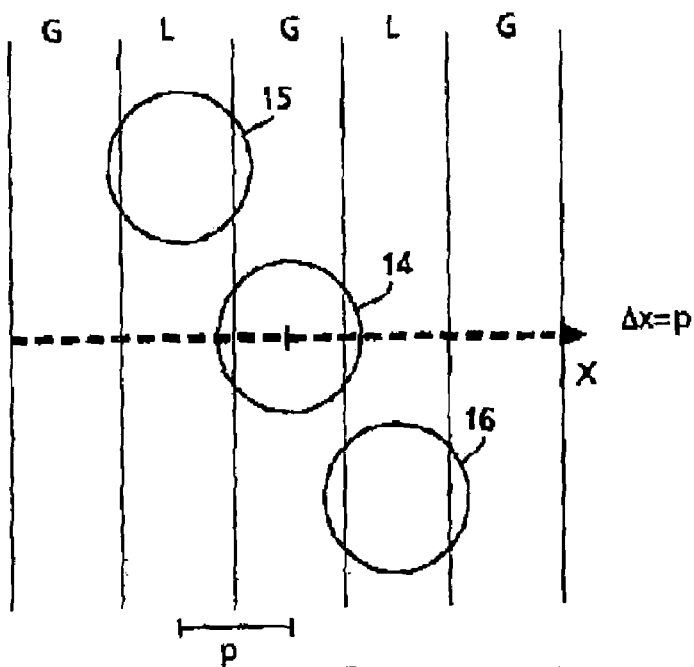
FIG. 8 shows a track image with beam arrangement and also the resultant track error signals in accordance with the prior art.
Figure 8:
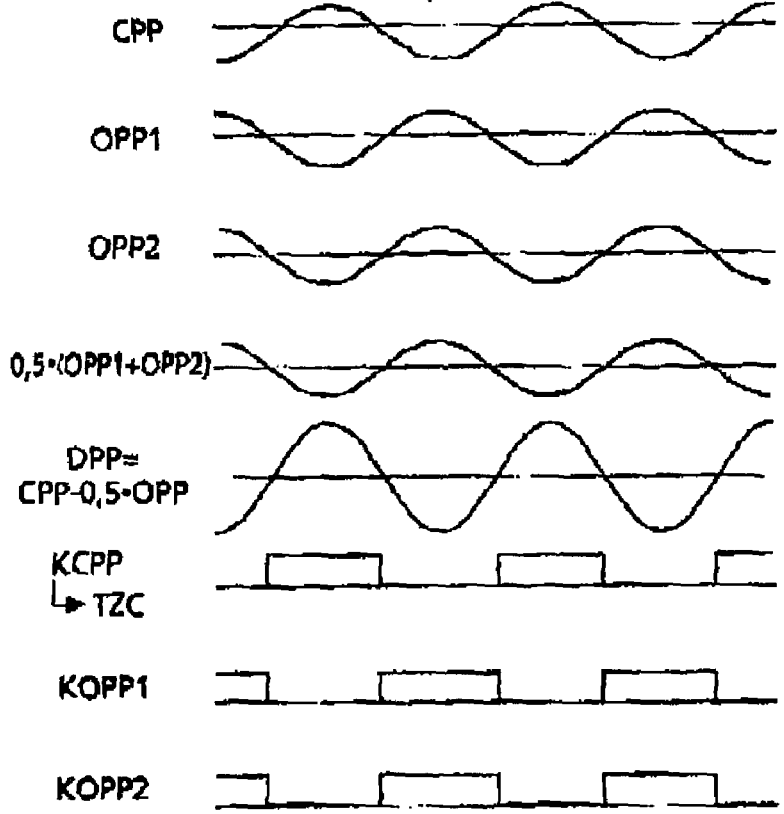

In this case, x designates, analogously to the imaginary x-axis depicted in FIG. 8, the scanning position of the respective secondary beam relative to the centre of the respectively scanned track and Δx designates the distance between the two secondary beams and an imaginary or additionally generated primary beam 14. p designates the track spacing. The two secondary beams reflected from the optical recording medium are generally detected in each case by a photodetector 11 and 13, respectively, of the photodetector unit 9, which has two light-sensitive areas E1, E2 and F1, F2, respectively. In this case, the two secondary-beam error signals are derived from the output signals E1, E2 and F1, F2, respectively, of the two photodetectors as follows:

$$OPP1 = E2 - E1 \quad (14)$$

$$OPP2 = F2 - F1 \quad (15)$$

The criterion for generating the two secondary beams with a phase offset of (2n+1)·90° between the resultant secondary-beam error signal reads as follows, applying the above formulae (12) and (13):

$$\sin\left(2\pi * \frac{x + \Delta x}{2p}\right) = \sin\left(2\pi * \frac{x - \Delta x}{2p} + m\pi\right) \quad (16)$$

where $m = \frac{2n + 1}{2}$ and $n = 0, 1, 2, \ldots$

It can be shown that equation (16) is satisfied under the following precondition:

$$\Delta x = m * \frac{p}{2} \text{ or } \Delta x = (2n + 1) * \frac{p}{4} \quad (17)$$

where $n = 0, 1, 2, \ldots$

If all Δx from this solution are used, the track error amplitude DPP can be increased or reduced as a result of the difference formation between the primary-beam error signal CPP and the secondary-beam error signals OPP1, OPP2. If the amplitude of the track error signal that is to be formed according to the DPP method is unimportant or if the secondary beam signals are only used for evaluation of the direction of movement, then it is possible to use all solutions described by formula (17) for Δx. If the secondary beam signals are intended to be used both for evaluating the direction of movement and for forming a track error signal that is to be formed according to the DPP method, then values of Δx which lead to a maximum amplitude of the track error signal DPP are preferable. If only the DPP track error amplitude is considered as a criterion, then, as already shown above, the track error amplitude is described according to formula (6) and becomes a maximum precisely when the above equation (7) is satisfied.

However, if there is a desire on the one hand to achieve a maximum DPP track error amplitude and on the other hand to obtain a phase of about ±90° between the secondary-beam track error signals DPP1 and DPP2, the track position should be set as follows:

$$\Delta x = (2j + 1) * p \pm \frac{p}{4} \text{ where } j = 0, 1, 2, \ldots \quad (18)$$

For all the distances—defined by formula (18)—between the secondary beams 15, 16 and the primary beam 14, the magnitude of the track error amplitude becomes as large as possible and, at the same time, the secondary-track error signals OPP1 and OPP2 have a phase difference of +90° or −90° with respect to one another in the event of a specific relative movement of the scanning beams with respect to the track.

Figure 1:
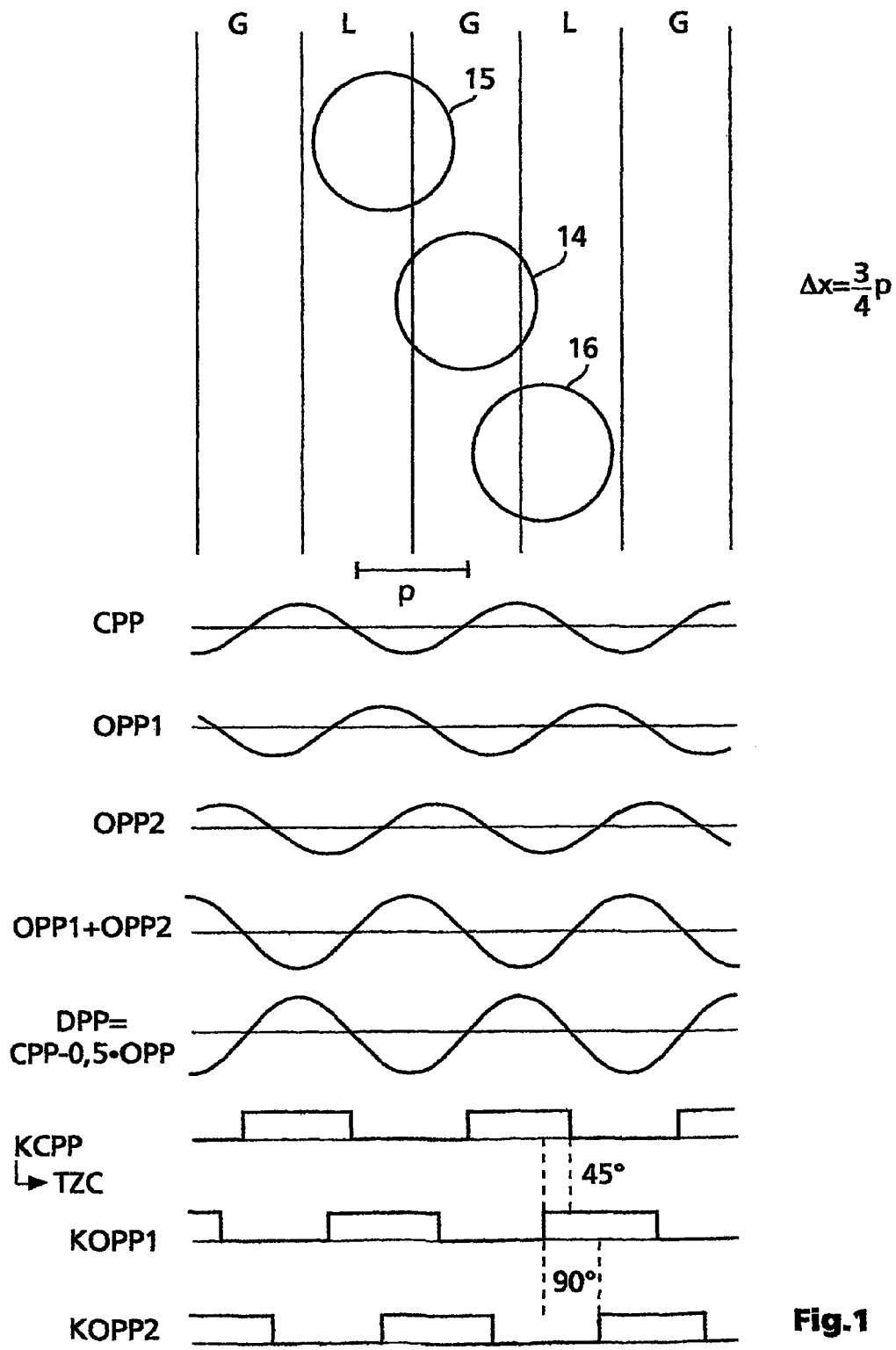
FIG. 1 shows an illustration of a track image with beam arrangement and also the resultant track error signals in accordance with a first exemplary embodiment of the present invention.

The first solution for this is Δx=3p/4. The corresponding track image with the arrangement of the primary beam 14 and secondary beams 15 and 16 is illustrated for this case in FIG. 1. FIG. 1 likewise illustrates the resultant track error signals CPP, OPP1, OPP2 and also DPP, the pulse signals KCPP, KOPP1 and KOPP2 being obtained from the signals CCP, OPP1 and OPP2, respectively, with the aid of corresponding comparators, the phase shift of which pulse signals with respect to one another can be evaluated in order to obtain the desired direction signal DIR, which, in the event of a track jump, for example, describes the direction of movement of the objective lens 6 relative to the tracks of an optical recording medium.

In the exemplary embodiment illustrated in FIG. 1, the two secondary-beam error signals OPP1 and OPP2 are used in order to detect the relative movement of the scanning beams 14-16 or of the objective lens 6 with respect to the respectively scanned track. However, it is also possible to use for this purpose only the phase of one of the secondary-beam error signals OPP1, OPP2 with respect to the phase of the primary-beam error signal CCP, as will be explained in more detail below with reference to FIG. 2 and FIG. 3.

From the relationships presented above, it is evident that the phase difference for example between the secondary-beam error signal OPP1 and the primary-beam error signal CPP is 90° when the secondary beams 15, 16 are imaged onto the optical recording medium 7 with $\Delta x=(2n+1)\cdot p/2$. The first solution is $\Delta x=\frac{1}{2}p$ in this case.

Figure 2:
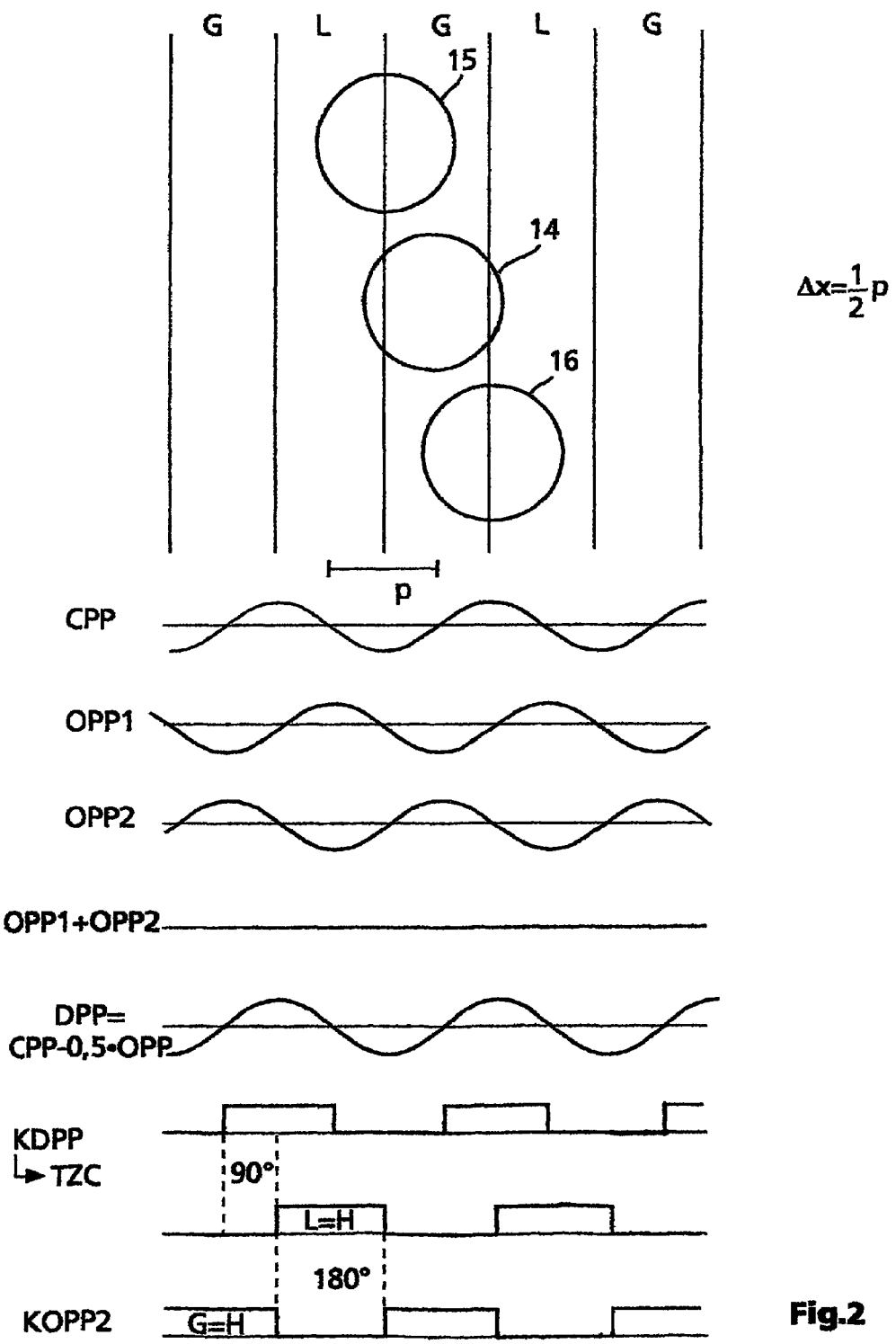
FIG. 2 shows a track image with beam arrangement and the resultant track error signals in accordance with a second exemplary embodiment of the present invention.

FIG. 2 illustrates a track image with a corresponding beam arrangement of the secondary beams 15, 16 with respect to the primary beam 14 and the resultant track error signals. The signal KOPP1 obtained from the secondary-beam error signal OPP1 assumes the level "H" whenever a "land" track is scanned, while the signal KOPP2 obtained from the secondary-beam error signal OPP2 assumes the level "H" when a "groove" track is scanned.

In the case of the beam arrangement shown in FIG. 2, the track error components of the two secondary-beam error signals OPP1 and OPP2 cancel one another out in the event of summation LCE=OPP1+OPP2. This case may be desirable, however, since the resultant summation signal then only yields a contribution dependent on the lens movement l of the objective lens and, if appropriate, in the event of a track jump, helps to stabilize the position of the objective lens. Given this orientation of the secondary beams 15, 16, then, there is the possibility of generating not only a direction signal which describes the direction of movement of the objective lens 6 but also a signal which represents the lens movement l. Equally, a track error signal DPP=CPP−0.5 (OPP1+OPP2) is available which, however, has only half the amplitude of the ideal DPP signal.

Figure 3:
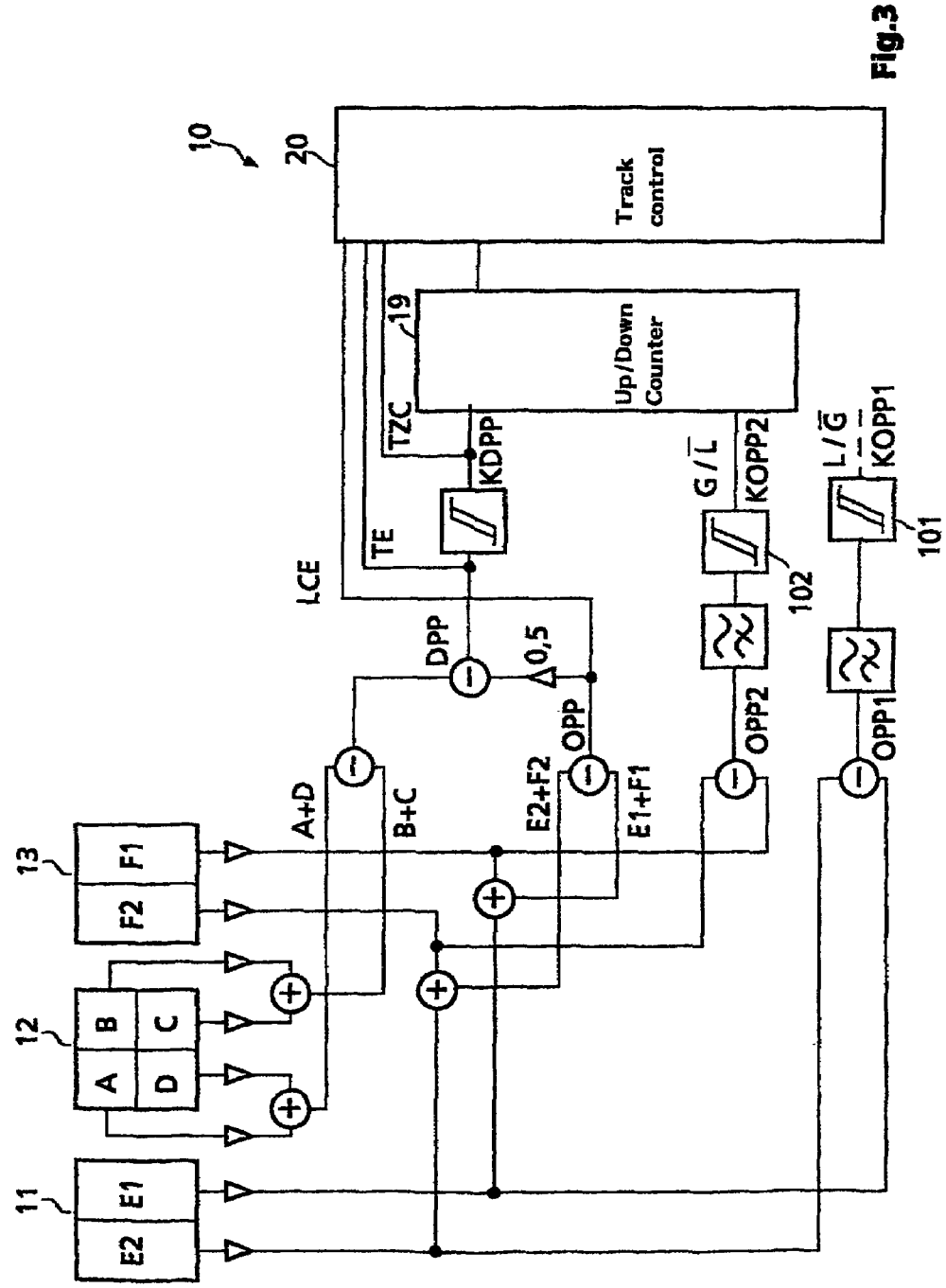
FIG. 3 shows an arrangement for identifying the jump direction in accordance with the second exemplary embodiment.

FIG. 3 illustrates a corresponding arrangement for this exemplary embodiment which can be used to generate and obtain the signals required for the track jump, for direction-dependent track counting and for identifying the track type. The signals shown in FIG. 2 form the basis in this case. As has already been mentioned, the secondary beams 15, 16 reflected from the optical recording medium 7 are respectively detected by photodetectors 11, 13 of the photodetector unit 9 which have two light-sensitive areas E1, E2 and F1, F2, respectively. By contrast, the primary beam, which is likewise reflected, is detected by a photodetector 12 having four light-sensitive areas A-D.

As shown in FIG. 3, the DPP signal is obtained from the output signals of the individual photodetectors 11-13. The signal OPP=(E2+F2)−(E1+F1) only has a component dependent on the lens movement l of the objective lens 6 and can therefore serve as a basis for the generation of a lens position signal LCE, which describes the position of the axis of the objective lens 6 with respect to the optical axis of the optical scanner. The actual track error signal TE can be obtained from the DPP signal. Moreover, a "track zero cross" signal TZC is obtained from the DPP signal with the aid of a suitable comparator.

As is likewise shown in FIG. 3, secondary-beam error signals OPP1 and OPP2 are obtained from the output signals of the photodetectors 11 and 13 and are respectively fed to a comparator 101, 102, in order, in a manner dependent thereon, to obtain the signals KOPP1 and KOPP2, respectively, which are shown in FIG. 2 and serve as a basis for identification of the respective track type ("groove" or "land"). In the case of the exemplary embodiment shown in FIG. 3, only the comparator signals KDPP and KOPP2 are fed to an up/down counter 19 for track counting. The direction of movement is determined from the phase difference between these two signals and the number of tracks crossed by the objective lens 6 is determined from the number of counting pulses, by an up/down counter 19. The lens position signal LCE, the track error signal TE, the signal TZC and also the counter reading of the up/down counter 19 are fed to a track control 20 for performance of exact track regulation. In addition, the comparator signal KOPP1 obtained on the basis of the secondary-beam error signal OPP1 can also be evaluated for example for determination of the track type, this—as has already been mentioned—not being taken into account in this exemplary embodiment. Since the signals KOPP1 and KOPP2 are complementary to one another in this exemplary embodiment, in practice it suffices to generate one of the signals and use it for track counting or for track control.

In the exemplary embodiment shown in FIG. 3, considered by itself, the secondary-beam error signal OPP2 evaluated by the up/down counter 19 has both a track error component and a lens-movement-dependent component. In order to suppress this lens-movement-dependent component, the signal OPP2—as is shown in FIG. 3—is advantageously fed to a high-pass filter before the signal passes through the corresponding comparator. This applies analogously to the signal OPP1.

If the difference between the secondary-beam error signals OPP1 and OPP2 is formed, the lens-movement-dependent component contained in these signals is cancelled out, so that all that remains in the difference signal determined therefrom is the actual track error component with a phase shift of ±90° with respect to the signal KDPP and TZC, respectively. A high-pass filter is no longer necessary in this case.

In addition to the above-described generation of three beams, it is also possible, in principle, by means of corresponding configuration of the diffraction grating 3 shown in FIG. 7, to direct only two or, alternatively, more than three beams onto the respective optical recording medium 7 in such a way that at least one of the beams impinges on a "groove" track and generates a corresponding track error signal, while at least one other beam impinges on the boundary between a "groove" and "land" track and likewise generates a corresponding track error signal which is phase-shifted through ±90° relative to the first-mentioned track error signal.

Figure 4:
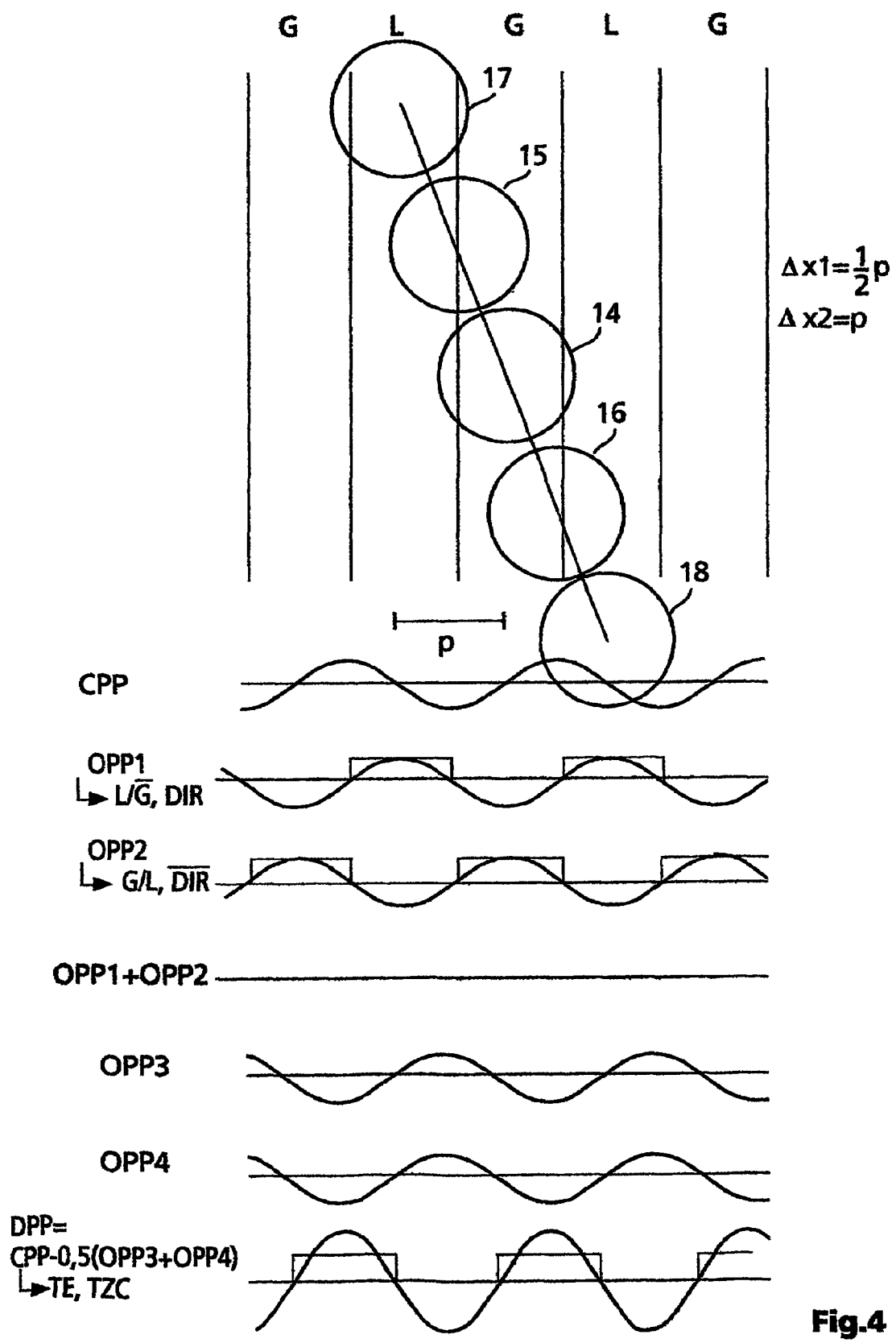
FIG. 4 shows a track image with beam arrangement and the resultant track error signals in accordance with a variant of the second exemplary embodiment of the present invention.

By way of example, a 5-beam scanner can be realized without an excessively high outlay, an exemplary beam arrangement being illustrated in FIG. 4. The ±1st-order secondary beams 15, 16 in each case impinge on edges between a "groove" and a "land" track, while the ±2nd-order secondary beams 17, 18 in each case impinge on the track centres of the tracks adjacent to the track scanned by the primary beam 14.

FIG. 4 also illustrates the track error signals which result from this beam arrangement, OPP1-OPP4 respectively designating the secondary-beam error signals obtained for the secondary beams 15-18. As can be seen from FIG. 4, the DPP signal is derived from the difference between the sum of the secondary-beam error signals OPP3, OPP4 obtained for the ±2nd-order secondary beams and the primary-beam error signal CPP, which DPP signal can again serve, analogously to FIG. 3, as a basis for obtaining the actual track error signal TE and the signal TZC. From the phase relationship of one of the secondary-beam error signals OPP1-OPP4 with respect to the primary-beam error signal CPP, it is possible to determine the direction of movement of the objective lens 6 relative to the tracks and also the number of tracks crossed. The sum of the two secondary-beam error signals OPP1, OPP2 yields a voltage which is proportional to the lens movement 1 and does not have a track error component since, as described above, the track error components cancel one another out.

In the beam arrangement shown in FIG. 4, the distance between the +1st-order secondary beams 15, 16 and the primary beam 14 is Δx1=p/2, while the distance between the ±2nd-order secondary beams 17, 18 and the primary beam 14 is Δx2=p.

Figure 6:
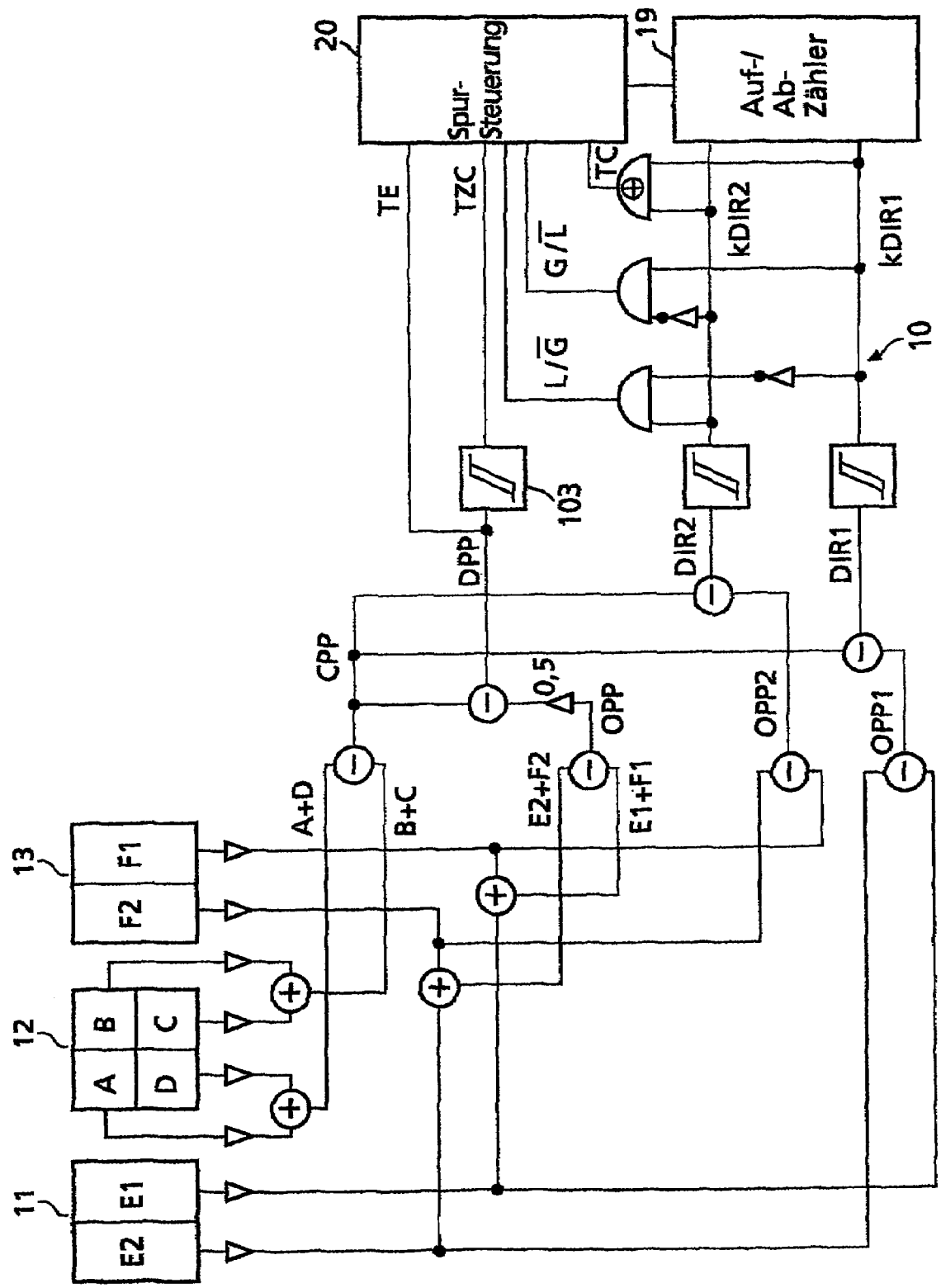
FIG. 6 shows an arrangement for identifying the jump direction in accordance with the third exemplary embodiment of the present invention.

Correspondingly, the present invention can also be applied to scanners with holographic optical components. All that is necessary for this purpose is to generate at least two beams which impinge on the optical recording medium 7 respectively used at a distance Δx from an (imaginary or existing) primary beam such that their imaging on the photodetector unit 9 generates two signals which have a phase shift of ±90° with regard to their track error component with respect to one another. These signals are typically caused by the push-pull effect. Likewise conceivable are holographic scanners whose track image looks like the track image shown in FIG. 1 or FIG. 2 and whose detector signals can correspondingly be evaluated by arrangements as shown in FIG. 3 and FIG. 6.

In general, for comparison of the phase angle, it is possible to use two signals which are generated either directly or indirectly by means of weighted combination of the output signals generated by the photodetector unit 9 shown in FIG. 7. In general, it is possible to use an optical scanner whose one or more scanning beams can be evaluated by a photodetector with a plurality of light-sensitive areas and an evaluation unit in such a way that the resulting output signals contain track-error-signal-proportional components which originate from mutually different scanning locations or regions of the scanned medium. The simplest way of being able to generate signals which contain track-error-signal-proportional components from different scanning locations is to image onto the optical recording medium 7 respectively used at least two or more beams with a beam position such that two signals having a phase shift of about ±90° are obtained.

However, it is also possible, when using only a single scanning beam, for example using holographic components in the scanner and by suitable evaluation of the light pencil—reflected from the optical storage medium—by means of a photodetector split into at least three light-sensitive areas, to generate two signals SPP1 and SPP2, which essentially correspond to the signals OPP1, OPP2 described above, and which contain track-error-proportional components which originate from mutually remote scanning points with respect to the scanned tracks. Since the track-error-proportional signal components generated in this way do not, in principle, have a phase shift of +90° or −90°, it is necessary to combine the signals after binarization by means of a comparator by means of a suitable logic evaluation. This is done, for example, analogously to the evaluation logic unit described in the following exemplary embodiment.

Two signals having a phase shift of 90° with respect to one another can also be derived from the combination of the secondary-beam error signals and the primary-beam error signal. This relates in particular to the case when the secondary beams are imaged onto the optical recording medium 7 with a distance of Δx=(2n+1)·p/2 from the primary beam. In this case, a phase difference of 180° results between the two secondary-beam error signals. If the secondary-beam error signals are respectively added to the primary-beam error signal or subtracted therefrom, this results in two signals which precisely have a phase shift of +45° and, respectively, −45° with respect to the primary-beam error signal and, consequently, depending on the counting direction, +90° and, respectively, −90° with respect to one another. In general, subtraction is preferable to addition since, when subtraction is employed, the components dependent on the lens movement 1 cancel one another out.

Figure 5:
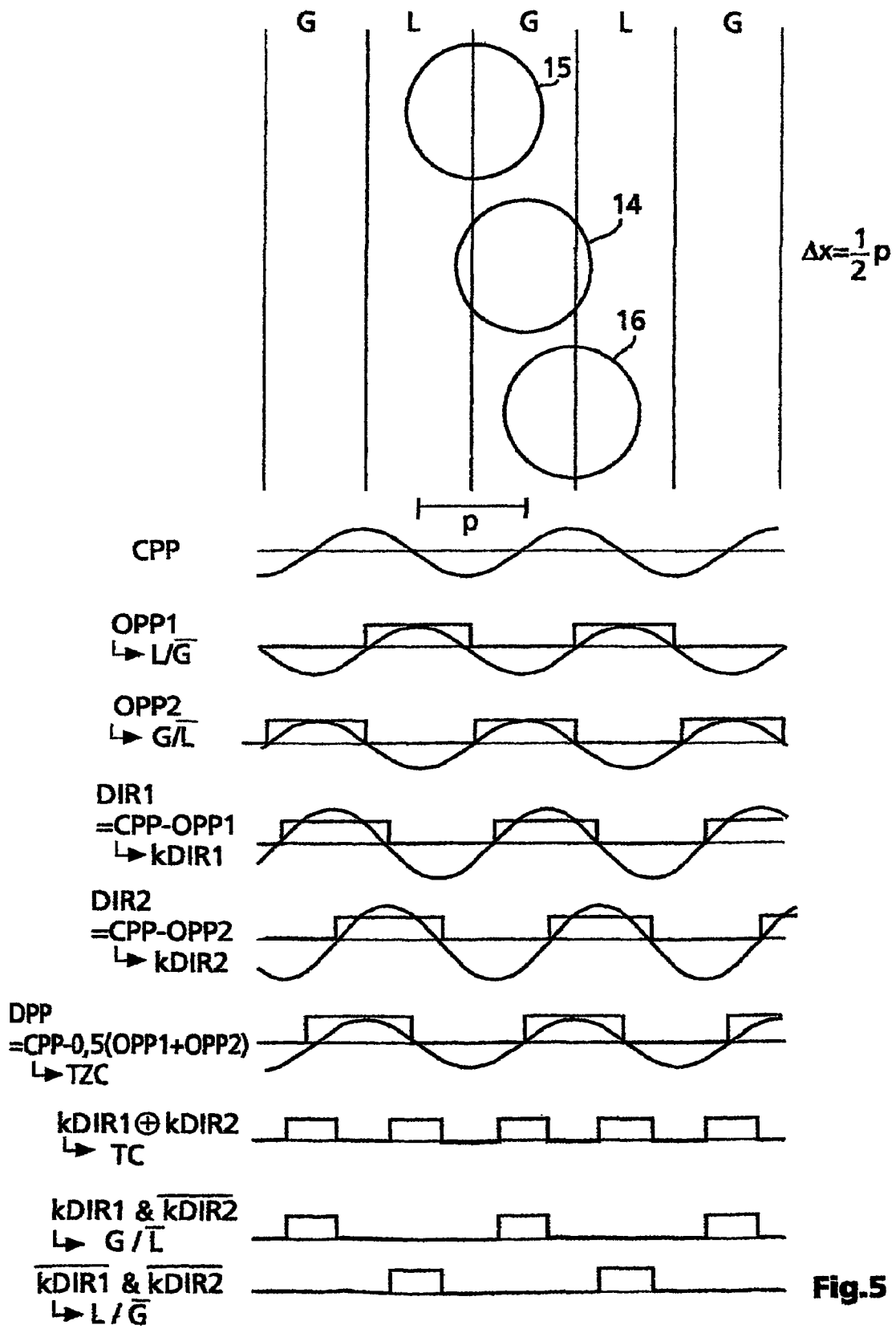
FIG. 5 shows a track image with beam arrangement and also the resultant track error signals in accordance with a third exemplary embodiment of the present invention.

FIG. 5 illustrates a track image with the beam arrangement of the secondary beams 15, 16 at Δx=p/2 from the primary beam 14 and also the resultant track error signals. Of the signals shown, the top three signals correspond to those of FIG. 2, and the further six signals are discussed in the following description. Furthermore, FIG. 6 illustrates a corresponding arrangement for obtaining the signals illustrated in FIG. 5.

As can be seen from FIG. 6, the following signals are derived from the primary-beam error signal CPP and the secondary-beam error signals OPP1, OPP2:

$$DIR1 = CPP - OPP1 \tag{19}$$

$$DIR2 = CPP - OPP2 \tag{20}$$

Using the above formulae (1) and (12), (13), it can be shown for Δx=p/2 that the following expression is produced for the difference signals DIR1 and DIR2:

$$DIR1 = \sqrt{2} * a * \cos\left(2p * \frac{x}{2p} + \frac{\pi}{4}\right) \tag{21}$$

$$DIR2 = \sqrt{2} * a * \cos\left(2p * \frac{x}{2p} - \frac{\pi}{4}\right) \tag{22}$$

If the secondary beams 15, 16 are calibrated to Δx=(2n+1)·p/2, then the resultant secondary-beam error signals OPP1 and OPP2 have a phase shift of +90° with respect to the primary beam. Consequently, the secondary-beam error signals have maxima on the track centres of the tracks and zero crossings at the edges of the tracks. If only one of the secondary-beam error signals is considered, it is possible to make an unambiguous assignment between polarity and type of track. In this way, not only is it possible for the direction-dependent track counting to be effected by the up/down counter 19 shown in FIG. 6, but there is also a possibility of detecting the type of track ("groove" or "land"). This property makes it possible to ascertain reliable track jumps and reliable determination of the best switch-on instant of the track regulator, for example on a predetermined track type, after a track jump.

In order to obtain the control signal TZC shown in FIG. 6, the signal DPP is converted into a corresponding digital signal by means of a comparator 103, likewise shown in FIG. 6. As an alternative, in order to obtain the signal TZC, the signal CPP can also be passed via a comparator. In order to avoid problems owing to the offset in CPP which is possible as a result of lens movement, it is advantageous in this case to provide AC coupling upstream of the comparator.

As already shown in FIG. 2 and again depicted in FIG. 6 for comparison, the track zero cross signal TZC already mentioned can be generated from the DPP signal, while the signal G/L for "groove"/"land" discrimination can be derived from OPP2.

However, if the difference signals DIR1 and DIR2, formed from the difference between the primary-beam error signal CCP and the secondary-beam error signals OPP1, OPP2, are used for direction identification, then these difference signals have a phase shift of ±45° with respect to the primary-beam error signal CPP. From FIG. 5, it becomes clear that these difference signals DIR1, DIR2 do not have their maxima on the track centres of the tracks and their zero crossings at the edges of the tracks. However, even in this case, with a low outlay on hardware, it is possible to generate signals which make it possible to distinguish the track type and the like, in order to ascertain reliable track jumps and reliable determination of the best switch-on instant of the track regulator 20 after a track jump.

As can be seen from FIG. 6, for this purpose, firstly the signals DPP, DIR1 and DIR2 are converted into corresponding digital signals by means of a comparator. Problems owing to the offset which is possible as a result of lens movement are not expected here since the lens-movement-dependent components are already compensated during the formation of the signals DPP, DIR1 and DIR2. Therefore, it is generally not necessary in this case to provide AC coupling upstream of the respective comparator. The output signals of the comparators are combined with one another by means of a simple evaluation logic unit in the manner which is shown in FIG. 6 and has already been described in more detail with reference to FIG. 5, and yield the signals TZC, TC ("track centre") and G/L ("groove"/"land").

The exemplary embodiment of an evaluation logic unit that is shown here essentially comprises logic inverters and AND combinations. From the signals KDIR1 and KDIR2 obtained according to FIG. 5, the two signals G/LQ and L/GQ are generated by the two following combinations (Q denotes inversion):

$$G/LQ = KDIR1 \& KDIR2Q$$

$$L/GQ = KDIR2 \& KDIR1Q$$

The two resulting signals have the advantage that they indicate the respectively detected track type in each case symmetrically with respect to the track centre by means of a logic "H". By means of an additional combination with the aid of an EXCLUSIVE-OR gate, it is possible, if necessary, to generate a signal TC which indicates the track centres independently of the respective track type.

The advantageous properties of this simple evaluation logic unit can likewise be applied to the signals KOPP1 and KOPP2 from FIG. 1 or 2 or to the track-error-proportional signals of a single-beam scanner described above. One advantageous property is that the signals G/LQ and L/GQ obtained by logic combination indicate the respectively detected track type always symmetrically with respect to the track centre by means of a logic "H". This applies to two- or multi-beam scanners independently of the secondary track distance, or to single-beam scanners independently of the mutually remote scanning points of the edge regions of the scanning beam, as long as the input signals of the evaluation logic unit which are derived from these edge regions of the scanning beam have a phase PHI of $0°<<\pm PHI<<360°$ with respect to one another. This requirement is fulfilled, for example in the case of a two- or multi-beam scanner, when using the secondary beams, for $0<\Delta x<p$. For secondary track distances $p<\Delta x<2p$, the phase between the input signals of the evaluation logic unit which are derived from the secondary beams is $360°<<\pm PHI<<720°$, and the meaning of the signals G/LQ and L/GQ is then inverted in each case. In practice, it should be noted in this case that, owing to a possible eccentricity of the optical storage medium, the track position changes somewhat within a revolution and, therefore, a certain distance should be preserved from the limits of the validity range of the secondary beam positions in the case of $\Delta x=0$, p, 2p.

Figure 9A:
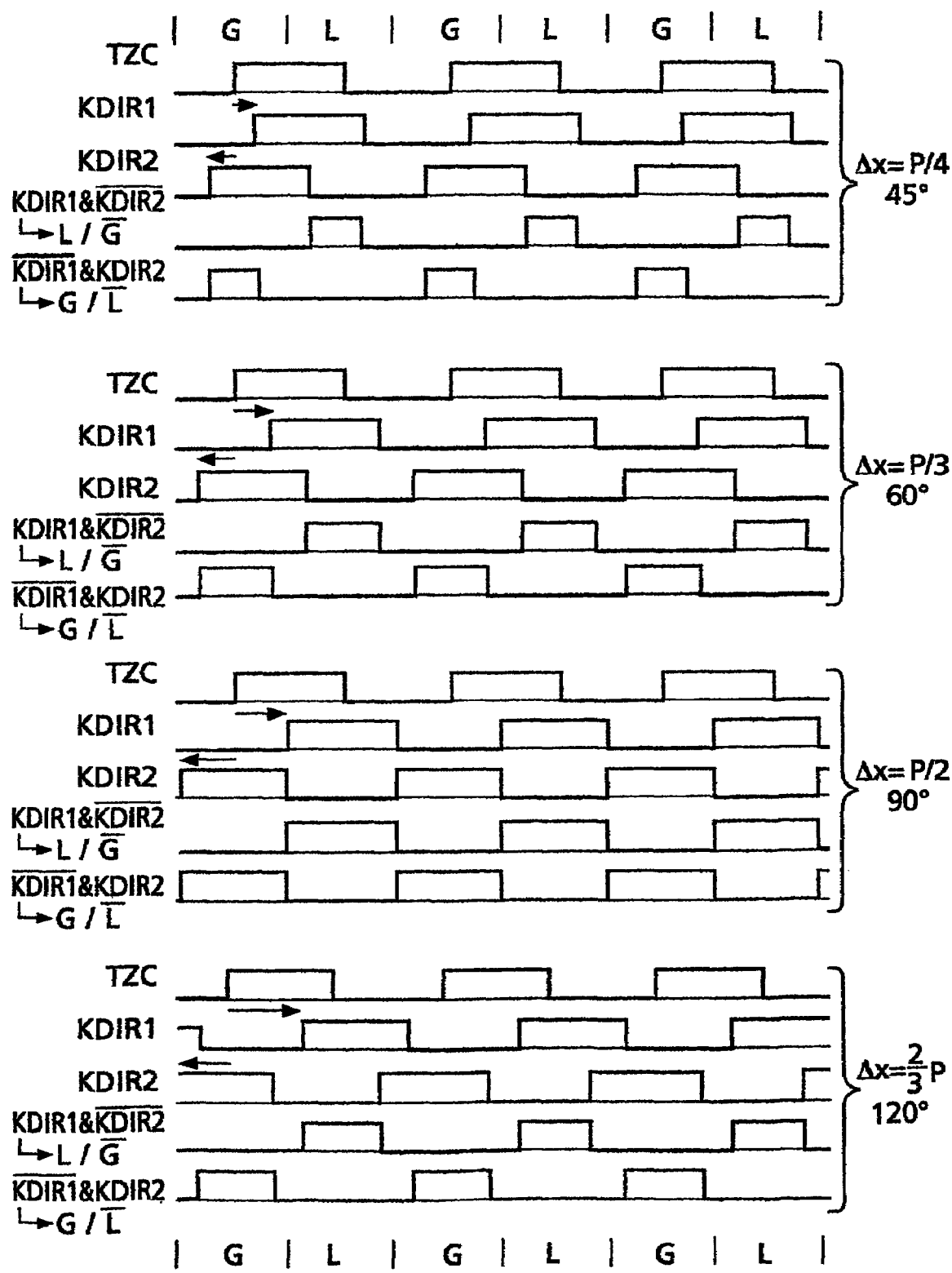
FIGS. 9a and 9b show, for different track spacings Δx, the binary signals derived from the track error signals in accordance with a further advantageous exemplary embodiment of the present invention.
Figure 9B:
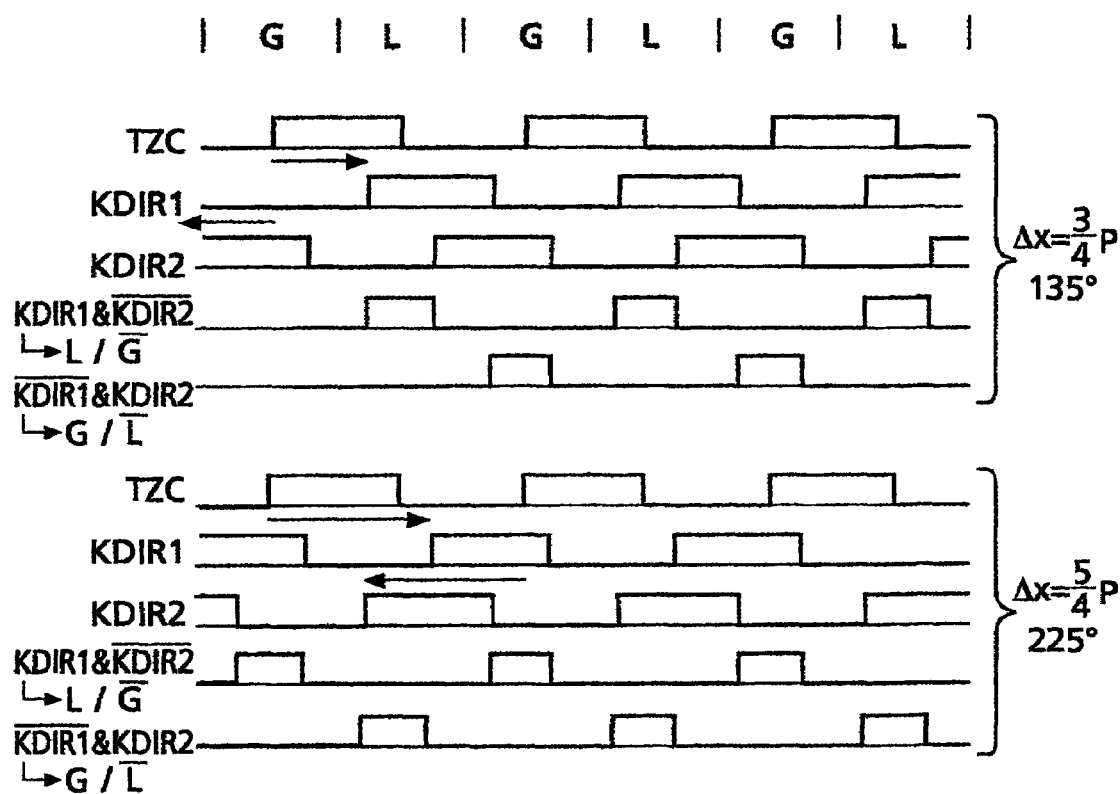
Figure 10:
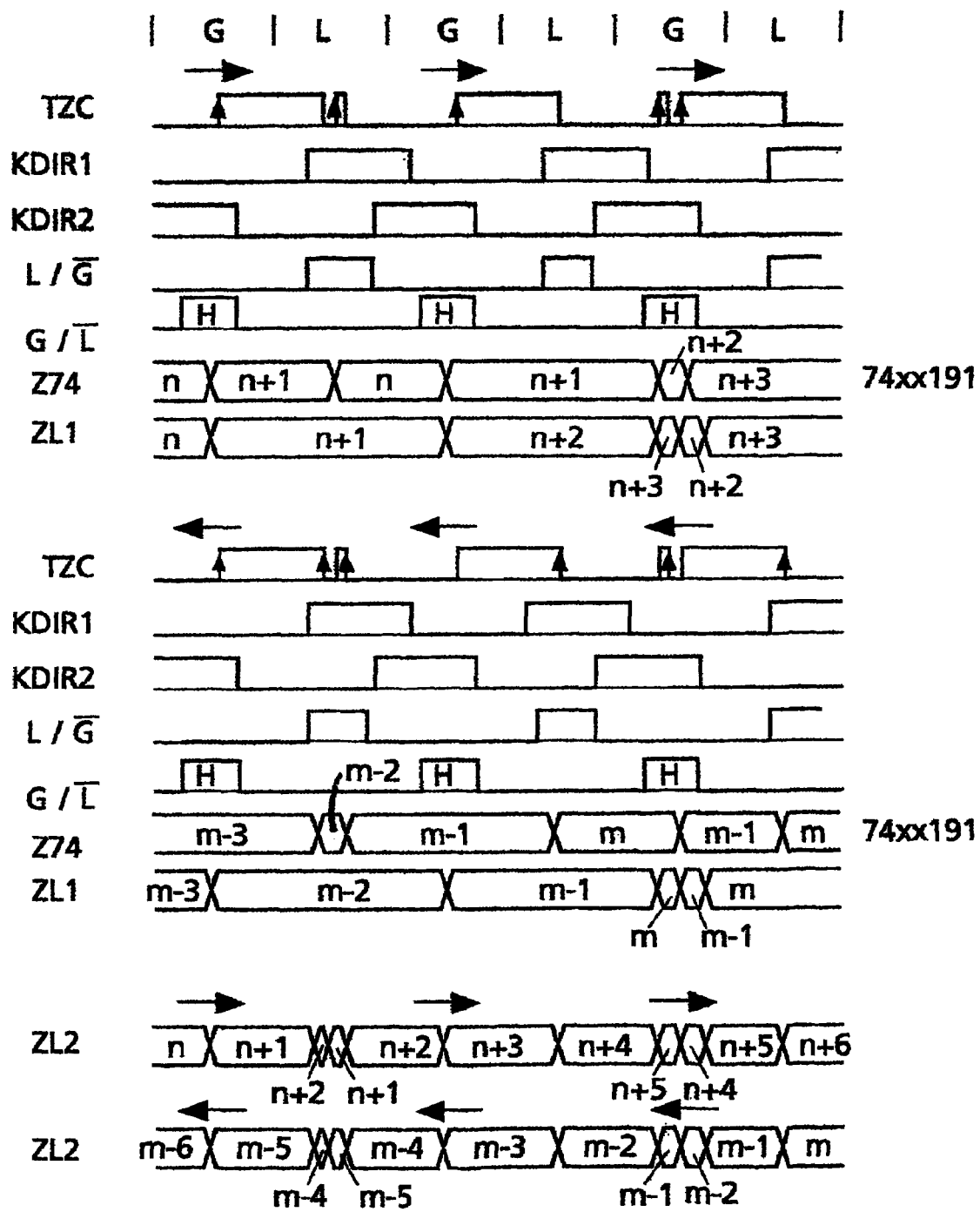
FIG. 10 shows, for one simple and two improved exemplary embodiments of the present invention, counter readings in the event of a track jump.

FIGS. 9a and 9b represent the output signals G/LQ and L/GQ resulting from such an evaluation logic unit for different secondary track distances $\Delta x$. These output signals exhibit a logic "H" independently of the secondary track distance chosen and always symmetrically with respect to the track centre. This property makes it possible, as an alternative to the signals KDIR1 and KDIR2 described above, to use the signals of the evaluation logic unit G/LQ and L/GQ both for identification of the track type and for track counting dependent on the direction of movement. As can be seen from FIGS. 5 and 9, the evaluation logic unit ensures that the track type can always be determined unambiguously at the instant of a zero crossing of the track error signal (DPP or CPP). Furthermore, the relative direction of movement between scanner and the tracks situated on the optical medium can always be determined unambiguously as is shown in FIG. 10. The arrows depicted are intended in each case to indicate the relative direction of movement. The groove (G) and land (L) structure of the recording medium is indicated in the topmost line. In the first block, showing the signals TZC, KDIR1, KDIR2, L/GQ, G/LQ, Z74 and ZL1, a movement from left to right is assumed, as indicated by the arrows situated above the signal TZC. In the block situated underneath, showing the signals TZC, KDIR1, KDIR2, L/GQ, G/LQ, Z74 and ZL1, a movement from right to left is assumed, as indicated by the arrows situated above the signal TZC. The bottom two lines show signals ZL2 for movement from left to right, upper line, and from right to left, lower line. In this case, signals Z74, ZL1 and ZL2, respectively, correspond to the counter readings in accordance with counter module 74XX191, a first and, respectively, a second state logic unit, as will be explained in more detail further below. Furthermore, in the example shown, the tracks are intended to be counted upwards for the first arrow direction and downwards for the second arrow direction. The diagram should then also be read in accordance with the arrow direction. For example, if only the positive zero crossings of the track error signal or the positive edges of the signal TZC derived therefrom are considered for track counting, then for the first direction of movement, in the event of a rising edge of the TZC signal, the signal G/LQ is always "H", which effects up-counting by 1 in the track counter. Equally, it is possible to use the signal L/GQ, since it always exhibits "L" in the event of rising edges of the TZC signal. In the case of the track direction indicated by the second arrow, the rising edges of the TZC signal always lie in the centre of an "H" level of the signal L/GQ or of an "L" level of the signal G/LQ, which effects down-counting of the track counter. For the realization within an apparatus for reading from or writing to an optical medium, it suffices to generate one of the two signals L/GQ or G/LQ, in order to be able to determine the counting direction of the track counter from their logic state when a rising edge of the TZC signal occurs. The relationships are outlined again in the following summary:

rising TZC edge and
    G/LQ=H→count up
    G/LQ=L→count down
    L/GQ=H→count down
    L/GQ=L→count up As an alternative to this, it is also possible to evaluate the falling edge of the TZC signal:

falling TZC edge and
    G/LQ=H→count down
    G/LQ=L→count up
    L/GQ=H→count up
    L/GQ=L→count down In the simplest case, the track counter comprises an edge-triggered up/down counter which has an up/down input and also an edge-controlled counting input ("clock"). A counter of this type is realized in the counter module 74XX191 of the known 74XX module family. In this case, the up/down input is connected to the G/LQ signal, while the TZC signal is connected to the counting input of the 74XX191, which input reacts to rising edges. Depending on the logic state at its counting direction input, this module counts up or down when positive edges occur at its counting input. However, this simple realization still has disadvantages, which can be avoided as follows.

Depending on the direction of movement or the arrow direction, the rising edges of the TZC signal occur in the "groove" centre in the event of movement from left to right or in the "land" centre in the event of movement from right to left. The consequence of this is that the counter reading changes in the "groove" centre in the event of movement towards the right, but in the "land" centre in the event of the opposite direction of movement. Furthermore, in practice, it can happen for example that the track error signals, near the zero crossing, are superposed with an interference or noise signal, for example the signal TZC in FIG. 10, and, after passing through the comparator, a plurality of edges are generated. This would mean that, in the case of one track being crossed, the counter reading increases by a plurality of increments, as is likewise shown in FIG. 10 for the 74XX191 module.

Figure 11:
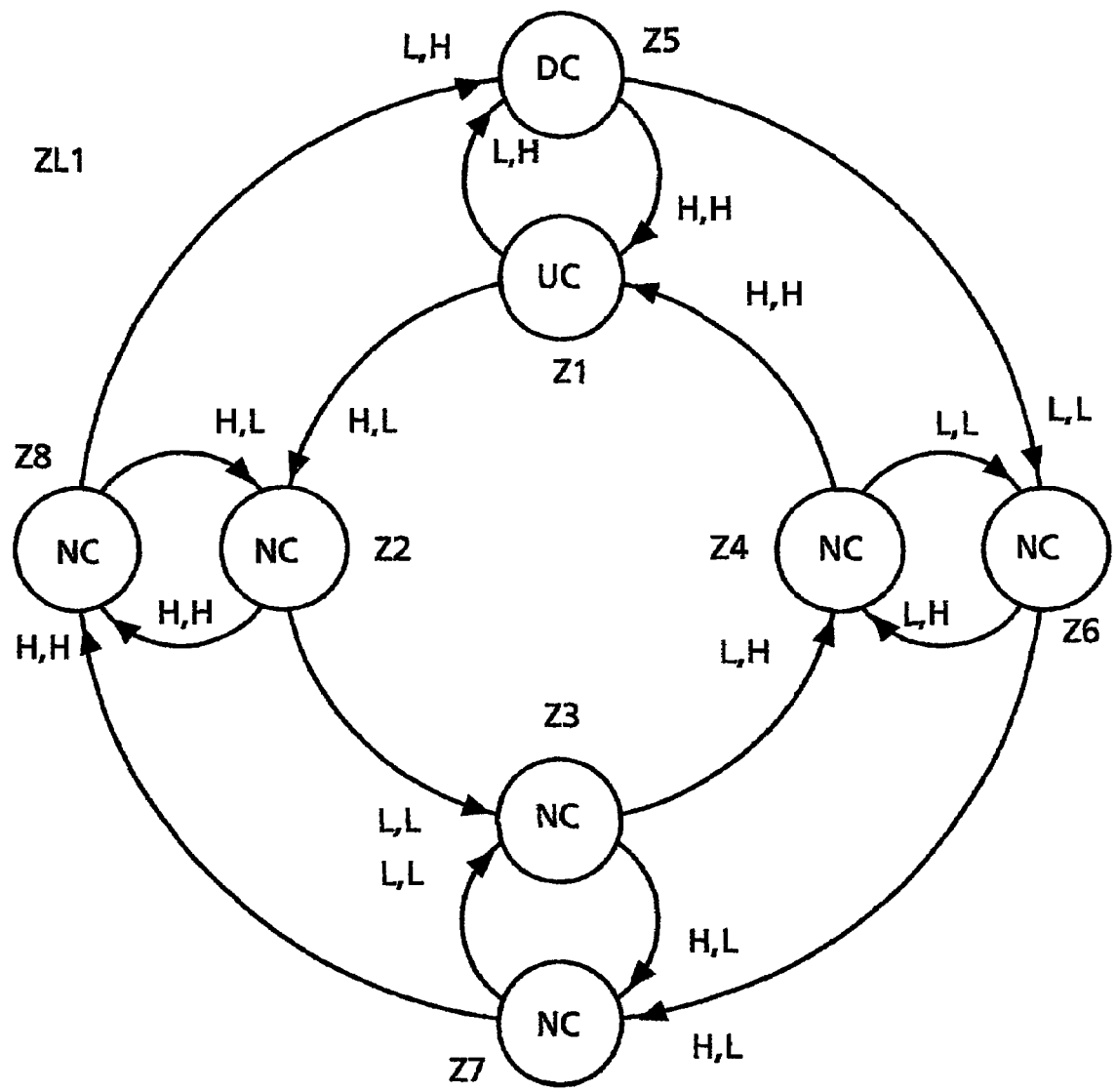
FIG. 11 shows an exemplary embodiment of an advantageous track-counting state logic unit with a resolution of Δx=2p.
Figure 12:
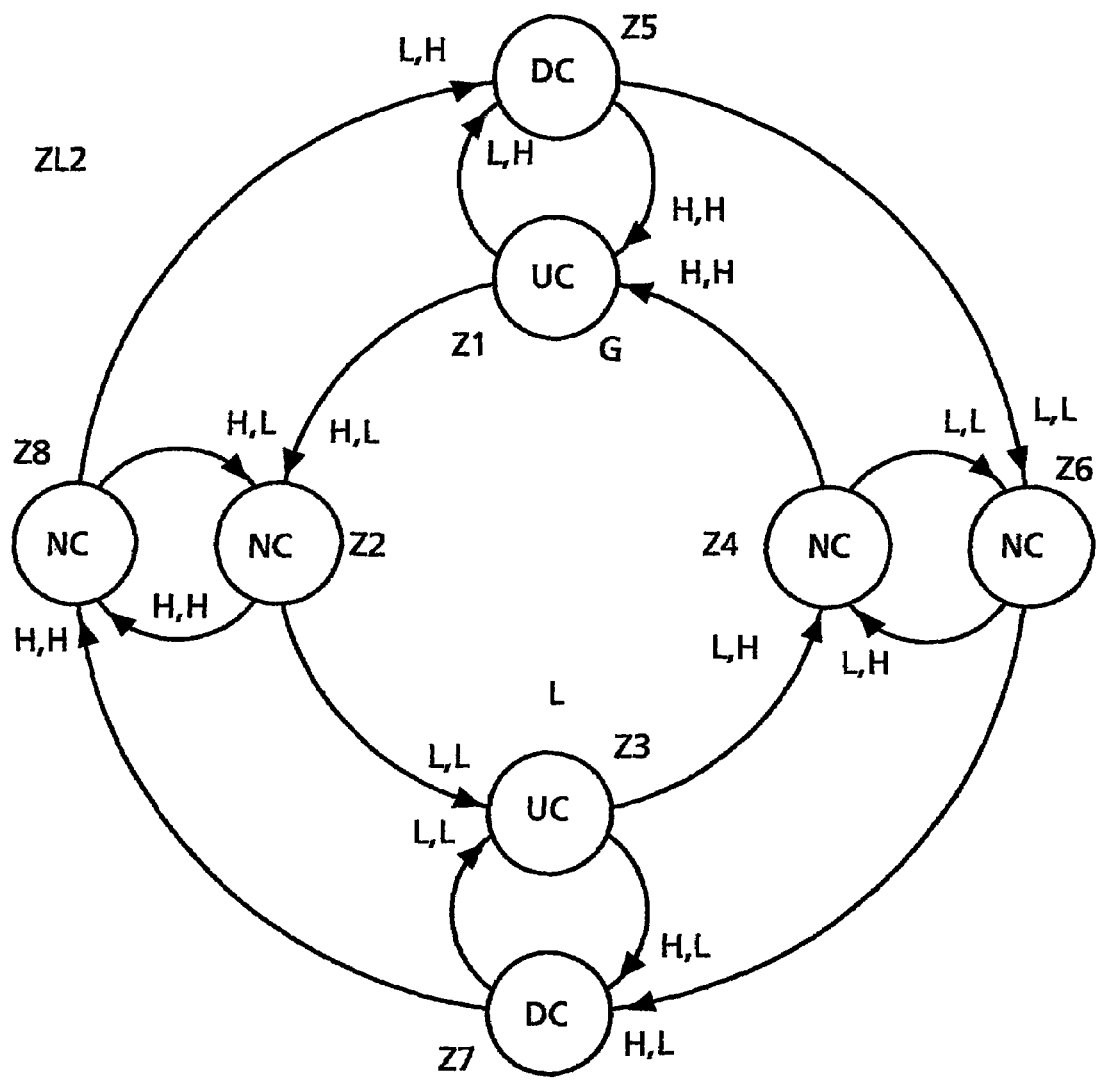
FIG. 12 shows an exemplary embodiment of an advantageous track-counting state logic unit with a resolution of Δx=p.

Such incorrect counting is avoided for example by using a state logic unit instead of the simple up/down counter, which allows only allowed sequences of the two signals TZC and G/LQ (alternatively L/GQ) for incrementing or decrementing the track counter. Exemplary embodiments of such a state logic unit are shown in FIGS. 11 and 12. In this case, the states Z1-Z8 are in each case represented by a circle from which a change is made to another state in accordance with the arrow, when the corresponding state change specified on the arrow occurs. In this case, the first letter relates to the state of the signal TZC, which is either high H or low L. The second letter relates to the signal G/LQ, which is likewise either high H or low L. In the event of a change to the new state, the counter reading is changed in accordance with the specification in the respective circle. When the state Z1 is reached, the counter reading is increased, which is indicated by UC for up count. When the state Z5 is reached, the counter reading is decreased, which is indicated by DC for down count. When the other states Z2-Z4 and Z6-Z8 are reached, the counter reading is not altered, indicated here by NC for no count.

In the example from FIG. 10, for movement from left to right, a start is made in the upper block on the far left in the state Z3, and both TZC and G/LQ are low. G/LQ then changes to high, while TZC is unchanged at low. Consequently, there is a transition to the state Z4 in accordance with the arrow identified by L, H. There is no change to the counter reading ZL1, which is specified by n. Next, the signal TZC also changes to high, and state Z1 is reached in accordance with the arrow identified by H, H, and, at the same time, the counter reading ZL1 is increased to n+1. In the subsequent transitions, the states Z2, Z3, Z7, Z3, Z4, Z1, Z2, Z3, Z4, Z1, Z5, Z1, Z2 are reached successively in accordance with the above pattern, and the counter reading ZL1 in this case changes to n+2, n+3, n+2, n+3. In the case of movement from right to left, in FIG. 10 the counter reading begins at m; this corresponds to state Z6. The states Z7, Z8, Z5, Z1, Z5, Z6, Z7, Z8, Z5, Z6, Z7, Z3, Z7, Z8, Z5, Z6 successively follow one another, and the counter reading changes as specified in FIG. 10. The state logic units ZL1 and ZL2 reliably prevent continuously incorrect track counting in the event of the multiple occurrence of an edge. However, since the direction of movement of the tracks relative to the scanning beam can change at any time, for example, in the case of an eccentrically mounted medium, it must be possible to reverse the counting direction in the state logic unit from any state. In FIGS. 11 and 12, this corresponds to a change from the inner to the outer state circle, and vice versa. The state logic units of FIGS. 11 and 12 differ in that, in the first case, the counter reading changes only when "groove" tracks are crossed. The resolution of the track counter is accordingly $2p$, which means, for each relative displacement of the scanning beam by 2p, the track counter is incremented or decremented by the value 1. If a track jump is controlled using this counter resolution, then it is possible only to implement jumps within identical track types, that is to say, for example, only from "groove" to "groove".

The use of a state logic unit as is shown in FIG. 12 is particularly advantageous. The resolution of this state logic unit shown in FIG. 12 is p. The advantage is that then even jump destinations with n times the distance defined by p can be correctly counted and reached. A jump from "groove" to "land" thus becomes directly possible. The designations of the state logic unit ZL2 in FIG. 12 correspond to those described for FIG. 11, counting being effected not only to groove in states Z1 and Z5 but also to land in states Z3 and Z7. The corresponding counter readings ZL2 are specified in the bottom two lines of FIG. 10.

A further advantageous variant for forming the signals KDIR1 and KDIR2 consists in firstly compensating the lens-movement-dependent component in the signals OPP1 and OPP2, respectively, before the signals KDIR1 and KDIR2 are generated therefrom by using a comparator. This is advantageous both when the phase of the signals KOPP1 and KOPP2 with respect to one another (see FIG. 1) is to be considered and when only one of the above-mentioned signals is to be related to the primary beam. Specifically when a plurality of scanning beams are used, as are necessary in the DPP method, it is possible according to the invention to generate a signal which is proportional to the lens movement and does not contain a track error component. This signal is designated by LCE below. The signal LCE, in a similar manner to the signal DPP, is generated from the signals CPP, OPP1 and OPP2. The formulae (1) and (2) described above form the basis, the weighting between the primary beam signal CPP and the secondary beam signals OPP being chosen such that the track-error-proportional component is cancelled out and the lens-movement-dependent component remains. The condition for this reads as follows:

$$LCE = DPP_x = CPP_x - G*(OPP1_x + OPP2_x) = 0 \quad (23)$$

In this case, the index "x" designates the track-error-dependent component of the corresponding signal. Using formulae (1) and (2), it follows that the track-error-dependent component x can be compensated if the following holds true:

$$DPP_x = a*\sin\left(\pi*\frac{x}{p}\right)*\left(1 - 2G*\cos\left(\pi*\frac{\Delta x}{p}\right)\right) = 0 \quad (24)$$

The track-error-dependent component of the DPP signal can thus be eliminated in a manner dependent on $\Delta x$ and $p$ if the following holds true:

$$1 - 2G*\cos\left(\pi*\frac{\Delta x}{p}\right) = 0 \quad (25)$$

Given an assumed distance between the secondary beams and the primary beam of $\Delta x=3p/4$, the following results in this respect:

$$G = -\frac{1}{\sqrt{2}} \quad (26)$$

Inserted into formula (23) the following thus results, for example, for $\Delta x=3p/4$:

$$LCE=CPP+0.707*(OPP1+OPP2) \quad (27)$$

From the negative sign of the weighting factor G in accordance with formula (26), it accordingly emerges that, for the practical realization, the subtraction must be replaced by an addition. The LCE signal can be generated in the range $0<\Delta x<2p$ and a DPP signal can simultaneously be generated only for the range $p/2<\Delta x<3p/2$. For the ranges $0<\Delta x<p/2$ and $3p/2<\Delta x<2p$ it holds true that only an LCE signal can be generated and the requisite factor G has a positive sign.

Since the signals OPP1 and OPP2 in each case contain a track-error-proportional component and also a lens-movement-dependent component, this lens-movement-dependent component can be compensated by suitable setting off with the LCE signal. In this case, the factor R is also a factor dependent on the scanning position $\Delta x$:

$$OPP1'=OPP1-R*LCE \text{ or}$$

$$OPP2'=OPP2-R*LCE \quad (28)$$

If equation (23) is inserted into equation (28), then the following results:

$$OPP1'=OPP1-R*(CPP-G*(OPP1+OPP2)) \text{ or}$$

$$OPP2'=OPP2-R*(CPP-G*(OPP1+OPP2)) \quad (29)$$

Since all the signal components CPP, OPP1 and OPP2 involved have the same sensitivity with regard to the lens movement and are in phase with respect to one another with regard to this lens movement component, the following must hold true:

$$R = \frac{1}{1-G} \quad (30)$$

As can be seen from formula (29), OPP1' and OPP2' could be calculated directly from the signal components CAPP, OPP1 and OPP2. However, since it is advantageous anyway to generate an LCE signal in the case of the practical realization of an apparatus for reading from or writing to optical storage media, the signal LCE, as proposed in formula (28), should be used for setting off with the respective secondary-beam track error signal.

The advantage of setting off according to formula (28) or (29) is that, for example, as a result of constant deflection of the objective lens from the optical axis of the scanner, a disturbing shift in the signals OPP1' and OPP2' is not produced as a result of the deflection-proportional offset. In the same way as the DPP signal only contains the track-error-proportional component as a result of setting off of CPP, OPP1 and OPP2, this can be achieved for the signals OPP1' and OPP2'.

For all of the weighting factors specified above, it should be noted that they are valid only if the intensities of the three scanning beams considered are identical when impinging on the photodetector unit 9. In practice, however, the intensity of the secondary beams is dependent on their track position, on the reflection of the track respectively scanned by the beams, and also on the properties of the diffraction grating 3, and is weaker than the intensity of the primary beam, with the result that the intensity of the secondary beams must correspondingly be scaled with respect to the primary beam intensity. This is ideally done by normalization. To that end, the error signals (LCE, OPP1, OPP2) obtained by forming the difference between individual detector signals are in each case divided by the sum of the individual detector signals respectively contained in this error signal.

Figure 13:
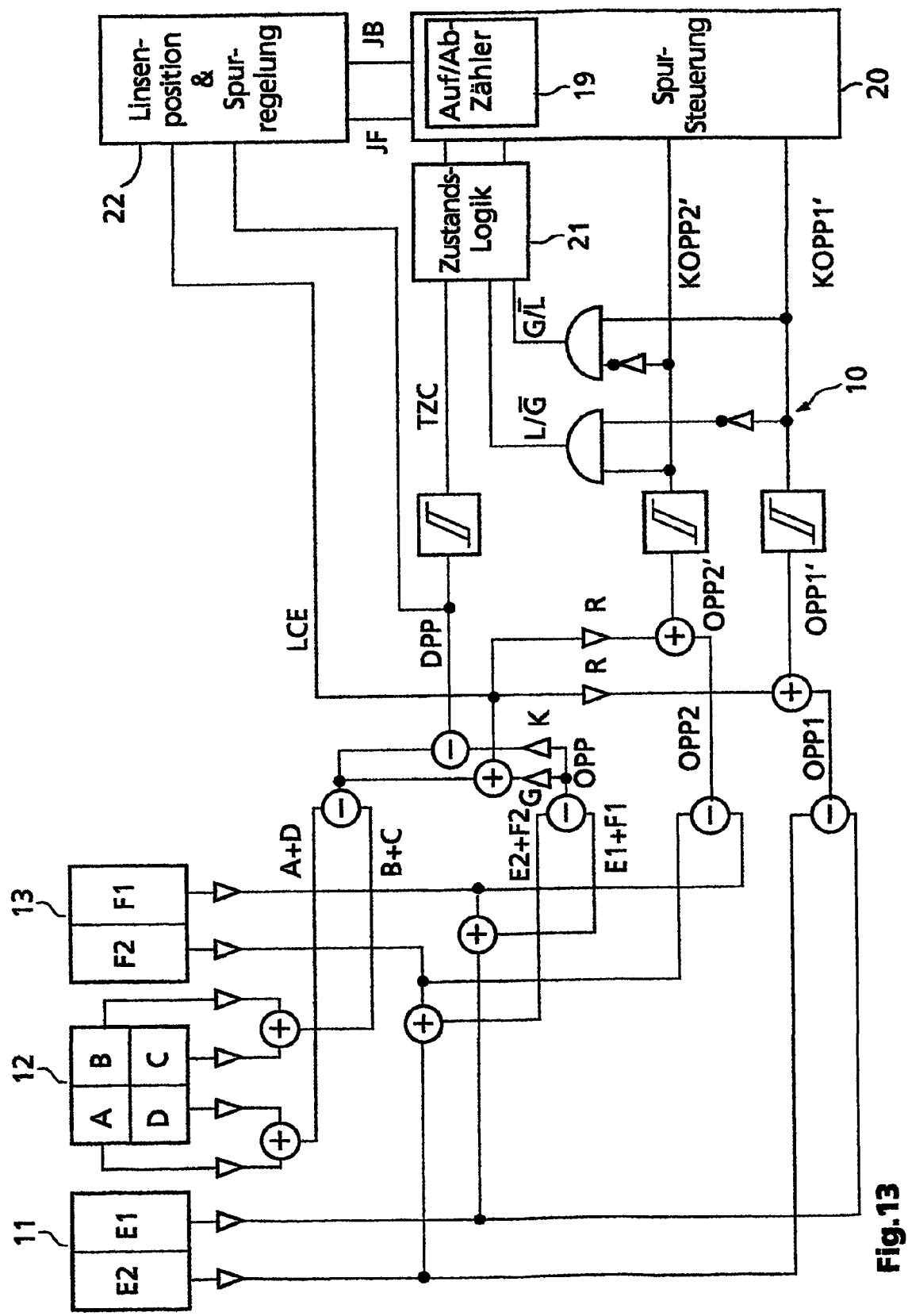
FIG. 13 shows a further exemplary embodiment of an advantageous arrangement of the present invention for movement-direction-dependent track counting.

FIG. 13 represents an exemplary embodiment with the advantageous variants described. In contrast to FIG. 6, the individual secondary beam signals OPP1 and OPP2 are converted by weighted setting off with LCE into the signals OPP1' and OPP2', which each pass through a comparator. The signals KOPP1' and KOPP2' thus obtained are fed to the track control 20, comprising inverters and also AND gates. From the output signals of the evaluation logic unit, the state logic unit 21 generates signals which represent the relative direction of movement and also the number of crossed tracks and control an up/down counter 19. The counter reading of this counter 19 is in turn evaluated together with the signals TZC, L/GQ or G/LQ for track control, in order, if appropriate, to output track control pulses JF and JB to a lens position and track regulation 22, if a track jump is intended to be carried out. The lens position and track regulation 22 evaluates the signals LCE and DPP in order to keep both the track error and the deviation of the objective lens 6 from the optical axis as small as possible. The signals JF and JB bring about a jump movement of the objective lens in the forward and backward direction, respectively, in the event of a track jump triggered by the track control.

The present invention is not restricted to the individual variants described, but rather also includes modifications and combinations thereof.

What is claimed is:

1. Method for direction-dependent track counting in an apparatus for reading from and/or writing to an optical recording medium having tracks, comprising the steps of
illuminating the optical recording medium by a beam of light having two or more scanning beams such that the beam of light is reflected from the recording medium, and light intensities of the scanning beams reflected from the optical recording medium are originating from scanning locations that are laterally remote from one another, as seen in a track direction,
imaging the light intensities reflected from these laterally remote scanning locations by an arrangement of optical components onto light-sensitive areas of a multiply divided photodetector, deriving at least two error signals by combination of output signals of the photodetector, which error signals in each case contain a track-error-dependent component which is caused by the laterally remote scanning locations, determining zero crossings of said at least two error signals, evaluating a phase difference between the at least two error signals, obtaining a relative lateral direction of movement of an objective lens of the apparatus relative to the tracks of the optical recording medium from said phase difference, and obtaining, in a direction-dependent way, a number of tracks crossed by the scanning beams based on said determined zero crossings of said error signals.

2. Method according to claim 1, wherein the optical recording medium is scanned by at least two scanning beams in such a way that the scanning beams scan scanning locations or tracks of the optical recording medium that are laterally remote from one another, as seen in the track direction, and that light intensities reflected from the laterally remote scanning locations are imaged onto the photodetector.

3. Method according to claim 2, wherein the optical recording medium is scanned by a primary scanning beam and also at least two secondary scanning beams in such a way that the primary scanning beam and also the secondary scanning beams scan scanning locations or tracks of the optical recording medium that are laterally remote from one another, as seen in the track direction, and these light intensities reflected from the laterally remote scanning locations are imaged onto the photodetector.

4. Method according to claim 3, wherein the error signals used to determine the relative direction of lateral movement of the objective lens relative to the tracks of the optical recording medium or the number of crossed tracks, are error signals derived from the reflected intensities of the primary scanning beam and the at least two secondary scanning beams.

5. Method according to claim 4, wherein the two secondary scanning beams are imaged onto the optical recording medium with a lateral distance $\Delta x$ from the primary scanning beam such that the error signals derived from the primary scanning beam and one of the secondary scanning beams have a phase shift PHI with respect to one another depending on the relative direction of movement, which phase shift lies in the range of $0° <<\pm PHI <<180°$ or $180° <<\pm PHI <<360°$, wherein $PHI=(\Delta x/p)*360°$ with p being the track spacing between middle of track and middle of directly adjacent track.

6. Method according to claim 4, wherein the two secondary scanning beams are imaged onto the optical recording medium with a lateral distance $\Delta x$ from the primary scanning beam such that the error signals derived from the primary scanning beam and one of the secondary scanning beams have a phase shift PHI of about $\pm 90°$ with respect to one another depending on the relative direction of movement, wherein $PHI=(\Delta x/p)*360°$ with p being the track spacing between middle of track and middle of directly adjacent track.

7. Method according to claim 4, wherein the two secondary scanning beams are imaged onto the optical recording medium with a lateral distances $\Delta x$ from the primary scanning beam which satisfies the following condition:

$$\Delta x = (2n+1) * \frac{p}{4} \text{ where } n = 0, 1, 2, \ldots$$

where p describes the distance between the tracks on the optical recording medium.

8. Method according to claim 3, wherein the error signals used to determine the relative direction of movement of the objective lens relative to the tracks of the optical recording medium or the number of crossed tracks, are error signals derived by combination of a primary-beam track error signal, obtained from the reflected intensity of the primary scanning beam, and a respective secondary-beam track error signal, obtained from the reflected intensity of the corresponding secondary scanning beam.

9. Method according to claim 8, wherein the two secondary scanning beams are imaged onto the optical recording medium with a lateral distance $\Delta x$ from the primary scanning beam such that the error signals derived by combination from the primary scanning beam and from a respective one of the secondary scanning beams have a phase shift PHI with respect to one another depending on the relative direction of movement, which phase shift lies in the range of $0° <<\pm PHI <<180°$ or $180° <<\pm PHI <<360°$, wherein $PHI=(\Delta x/p)*360°$ with p being the track spacing between middle of track and middle of directly adjacent track.

10. Method according to claim 8, wherein the two secondary scanning beams are imaged onto the optical recording medium with a lateral distance $\Delta x$ from the primary scanning beam such that the error signals derived by combination from the primary scanning beam and from a respective one of the secondary scanning beams have a phase shift of about $\pm 90°$ with respect to one another depending on the relative direction of movement, wherein $PHI=(\Delta x/p)*360°$ with p being the track spacing between middle of track and middle of directly adjacent track.

11. Method according to claim 8, wherein the two secondary scanning beams are imaged onto the optical recording medium with a lateral distance $\Delta x$ from the primary scanning beam which satisfies the following condition:

$$\Delta x = (2n+1) * \frac{p}{2} \text{ where } n = 0, 1, 2, \ldots$$

where p describes the distance between the tracks on the optical recording medium.

12. Apparatus for reading from and/or writing to an optical recording medium having tracks comprising:

a receptacle to which the optical recording medium is placeable or from which it is removable, a beam generating unit generating a beam of light having two or more scanning beams, an objective lens for focusing said scanning beams onto tracks of said optical recording medium, if present in said receptacle, and for guiding said scanning beams along tracks of said recording medium, a photodetector having a plurality of light-sensitive areas for detecting light intensities which are reflected from an optical recording medium, if present in said receptacle, and which originate from different scanning locations in a track direction of the optical recording medium, and an evaluation unit for deriving error signals, each having a track-error-dependent component caused by the different scanning locations, by combining output signals of the photodetector, wherein the evaluation unit is configured in such a way that it obtains a relative lateral direction of movement of an objective lens of the apparatus relative to the tracks of the optical recording medium, if present in said receptacle, by evaluating a phase difference between at least two of the error signals, and the number of tracks crossed by the scanning beams by determining a number of zero crossings of said at least two of the error signals.

* * * * *